US012350948B2

(12) United States Patent
Mizutani et al.

(10) Patent No.: US 12,350,948 B2
(45) Date of Patent: Jul. 8, 2025

(54) PRINTING SYSTEM AND PROCESSING APPARATUS

(71) Applicant: SEIKO EPSON CORPORATION, Tokyo (JP)

(72) Inventors: Seigo Mizutani, Matsumoto (JP); Hideki Okada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 199 days.

(21) Appl. No.: 18/172,065

(22) Filed: Feb. 21, 2023

(65) Prior Publication Data

US 2023/0264488 A1 Aug. 24, 2023

(30) Foreign Application Priority Data

Feb. 22, 2022 (JP) ................................. 2022-025971

(51) Int. Cl.
*B41J 3/407* (2006.01)
*B41J 11/00* (2006.01)
*B41J 19/00* (2006.01)
*B41J 29/17* (2006.01)

(52) U.S. Cl.
CPC ........... *B41J 3/4078* (2013.01); *B41J 11/002* (2013.01); *B41J 19/005* (2013.01); *B41J 29/17* (2013.01)

(58) Field of Classification Search
CPC ...... B41J 3/4078; B41J 11/002; B41J 19/005; B41J 29/17; B41J 2/21; B41J 11/00222; B41J 11/005; B41J 15/08; D06C 7/00; D06C 11/00
See application file for complete search history.

(56) References Cited

U.S. PATENT DOCUMENTS

2023/0098056 A1 3/2023 Okada et al.

FOREIGN PATENT DOCUMENTS

| | | | | |
|---|---|---|---|---|
| CN | 211546943 | | | 9/2020 |
| CN | 211546943 | U | * | 9/2020 |
| DE | 3009475 | | | 4/1981 |
| GB | 1209220 | | | 10/1970 |
| JP | 2012112082 | A | * | 6/2012 |
| JP | 2021-084279 | A | | 6/2021 |

OTHER PUBLICATIONS

Yang, Textile Repeatedly Dyeing Device With Good Use Effect (CN 211546943), Sep. 22, 2020, [Specific Implementation Examples, Paragraphs 0005 and 0007]. (Year: 2020).*
Nagase, Makato et al., Ink-Jet Printing Device and Method for Producing Printed Textile Product by Ink-Jet Printing (JP 2012112082 A), Jun. 4, 2012, [Abstract, Description of Embodiments: Control part]. (Year: 2012).*

* cited by examiner

*Primary Examiner* — Lisa Solomon
(74) *Attorney, Agent, or Firm* — WORKMAN NYDEGGER

(57) ABSTRACT

A printing system includes a printing apparatus that performs printing on a fabric, a processing apparatus, and a control apparatus. The processing apparatus includes contact members having a plurality of protrusions that come in contact with a fabric on which printing has been performed by the printing apparatus, and vibration applying units including vibration generating sources that apply vibration to the contact members. The control apparatus controls an operation of the processing apparatus according to an operation of the printing apparatus.

10 Claims, 4 Drawing Sheets

PRINTING SYSTEM AND PROCESSING APPARATUS

The present application is based on, and claims priority from JP Application Serial Number 2022-025971, filed Feb. 22, 2022, the disclosure of which is hereby incorporated by reference herein in its entirety.

BACKGROUND

1. Technical Field

The present disclosure relates to a printing system and a processing apparatus that control texture and the like by performing physical processing on a fabric with printing thereon.

2. Related Art

JP-A-2021-084279 discloses a printing system including a printer which is a printing apparatus that performs printing by ejecting ink, and a post-processing machine that performs a predetermined post-processing step on a printed product obtained by performing a printing step with the printer, and a control apparatus that determines conditions for the post-processing step based on conditions for the printing step. The post-processing machine is a steaming machine or a washing machine. The washing machine uses a large amount of water for washing and energy, and in this case, the post-processing step is a washing step. The control apparatus controls steaming or washing conditions that are, for example, conditions for the washing step based on conditions for the printing step.

However, although a fabric on which printing has been performed is processed using a steaming machine or a washing machine in the printing system described in JP-A-2021-084279, there is a problem that the processing is insufficient to improve the texture of the fabric.

SUMMARY

A printing system to solve the above-described problem includes a printing apparatus that performs printing on a fabric, a processing apparatus including a contact member including a plurality of protrusions that come in contact with the fabric on which printing has been performed by the printing apparatus and a vibration applying unit including a vibration generating source that applies vibration to the contact member, and a control apparatus that controls an operation of the processing apparatus according to an operation of the printing apparatus.

The processing apparatus to solve the above-described problem is a processing apparatus that processes a fabric supplied from a printing apparatus that performs printing on the fabric on which printing has been performed, and includes a contact member having a plurality of protrusions that come in contact with the fabric supplied from the printing apparatus, a vibration applying unit including a vibration generating source that applies vibration to the contact member, and a control apparatus that controls a fabric processing operation of the contact member to which vibration is applied by the vibration generating source, and the control apparatus controls the fabric processing operation according to an operation of the printing apparatus.

DESCRIPTION OF EXEMPLARY EMBODIMENTS

Figure 1:
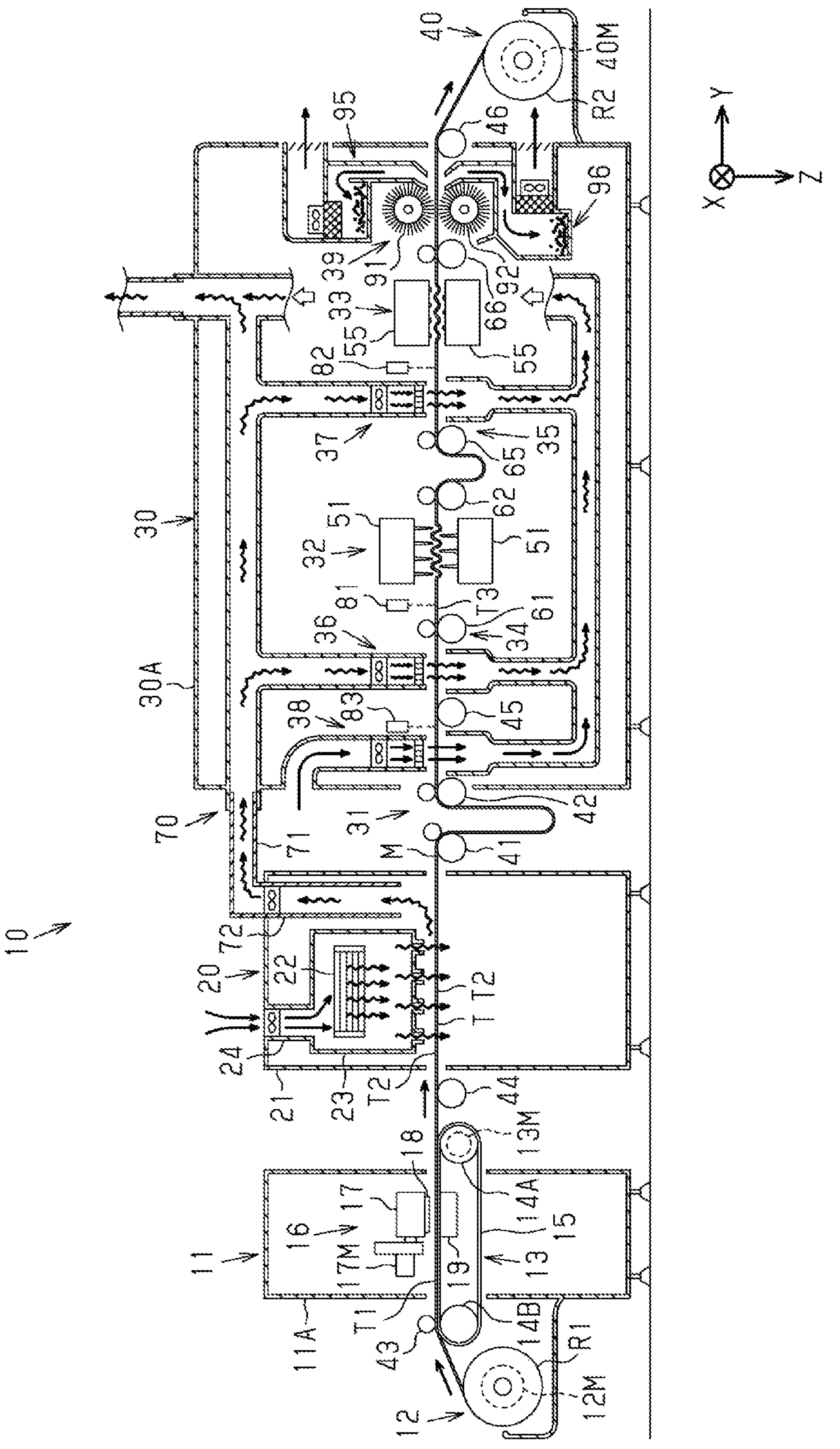
FIG. 1 is a schematic cross-sectional side view illustrating a printing system according to an embodiment.

Embodiments of a printing system will be described below with reference to the accompanying drawings. Assuming that the printing system 10 illustrated in FIG. 1 is placed on a horizontal plane, the direction of gravity is indicated as a Z axis, and the directions along the horizontal plane are indicated as an X axis and a Y axis. The X axis, the Y axis, and the Z axis are orthogonal to one another. In the following description, the direction along the Y axis is also referred to as a conveyance direction Y because it is the direction in which a fabric M is conveyed in the printing system 10. In addition, the direction along the X axis is also referred to as a width direction X because it is the width direction intersecting the conveyance direction Y in which the fabric M is conveyed. Furthermore, a direction along the Z axis is also referred to as a vertical direction Z.

Configuration of Printing System 10

Figure 2:
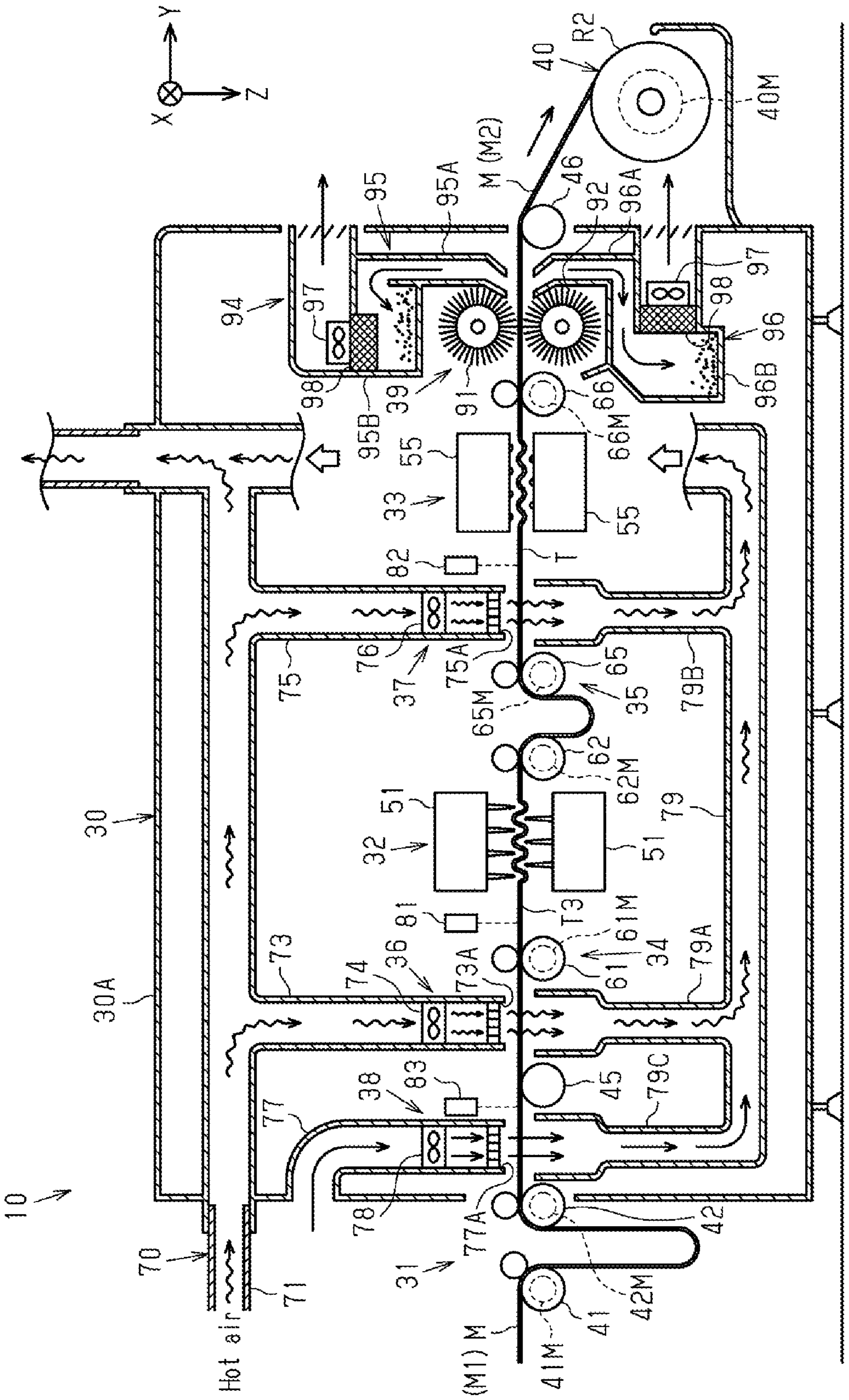
FIG. 2 is a schematic cross-sectional side view illustrating a processing apparatus.

A configuration of the printing system 10 will be described with reference to FIGS. 1 and 2. As illustrated in FIGS. 1 and 2, the printing system 10 includes a printing apparatus 11 that performs printing on a fabric M, and a processing apparatus 30 that processes the fabric M on which printing has been performed by the printing apparatus 11.

The processing apparatus 30 includes vibration applying units 32 and 33 that come in contact with the fabric M on which printing has been performed by the printing apparatus 11 to apply vibration to the fabric M and thus improve the texture of the fabric M. That is, the processing apparatus 30 is a texture improvement processing apparatus that improves texture of the fabric M. The vibration applying units 32 and 33 improve the texture of the fabric M by breaking a part of the fabric M including a surface layer thereof. The processing apparatus 30 of this embodiment includes a first vibration applying unit 32 for roughing and a second vibration applying unit 33 for finishing. Further, a configuration with only one of the vibration applying units 32 and 33 may be adopted.

In addition, the printing system 10 may include a drying apparatus 20 that dries the fabric M on which printing has been performed by the printing apparatus 11 as illustrated in FIG. 1. The drying apparatus 20 is provided between the printing apparatus 11 and the processing apparatus 30 in the conveyance direction Y of the fabric M. The drying apparatus 20 performs a drying process on the fabric M that has undergone the printing process by the printing apparatus 11, that is, the fabric M on which printing has been completed. The processing apparatus 30 receives supply of the fabric M that has undergone the drying process by the drying apparatus 20.

The printing system 10 conveys the fabric M in the roll-to-roll method. The printing system 10 includes a feeding unit 12 in which a first roll body R1 is mounted, the first roll body having the fabric M before printing wound there-around, and a winding unit 40 that winds the fabric M with texture processed after printing as a second roll body R2. In this embodiment, the feeding unit 12 is provided in the printing apparatus 11, and the winding unit 40 is provided in the processing apparatus 30. The fabric M fed from the first roll body R1 mounted on the feeding unit 12 is subjected to printing while passing through the printing apparatus 11, the printing on the fabric M is dried while the fabric passes through the next drying apparatus 20, and further, the texture of the fabric M is improved while the fabric passes through the processing apparatus 30. Then, the fabric M having improved texture is wound as the second roll body R2 by the winding unit 40.

The printing system 10 includes a conveyance path T along which the fabric M is conveyed from the feeding unit 12 to the winding unit 40. The conveyance path T includes a first conveyance path T1 which is a path on which the printing apparatus 11 conveys the fabric M, a second conveyance path T2 which is a path on which the drying apparatus 20 conveys the fabric M, and a third conveyance path T3 which is a path on which the processing apparatus 30 conveys the fabric M.

In this way, in the course of being fed from the feeding unit 12 and wound around the winding unit 40, printing by the printing apparatus 11, drying by the drying apparatus 20, and the texture improvement process by the processing apparatus 30 are continuously performed on the conveyed fabric M.

The printing system 10 includes a control apparatus 100 (see FIG. 5) that controls operations of the processing apparatus 30 in response to operations of the printing apparatus 11. Details of control of the control apparatus 100 over the operations of the processing apparatus 30 in response to the operations of the printing apparatus 11 will be described below.

Next, configurations of the printing apparatus 11, the drying apparatus 20, and the processing apparatus 30 constituting the printing system 10 will be described in detail in order. First, a configuration of the printing apparatus 11 will be described with reference to FIG. 1.

Configuration of Printing Apparatus 11

The printing apparatus 11 performs printing on the fabric M as illustrated in FIG. 1. That is, the printing apparatus 11 performs a printing process on the fabric M. The printing apparatus 11 applies a liquid onto the fabric M to perform printing on the fabric M. The printing apparatus 11 includes a housing 11A. The feeding unit 12 is supported on the outside of the housing 11A. The feeding unit 12 includes a feeding motor 12M that is a drive source for rotating the mounted first roll body R1 in the feeding direction. The printing apparatus 11 includes a conveyor unit 13 that conveys the fabric M fed from the feeding unit 12. The conveyor unit 13 includes a driving roller 14A, a driven roller 14B, and an endless conveyor belt 15 suspended on both rollers 14A and 14B. The conveyor unit 13 includes a conveyor motor 13M that is a drive source for rotating the driving roller 14A. The conveyor motor 13M drives to rotate the conveyor belt 15. The fabric M on the conveyor belt 15 is conveyed in the conveyance direction Y as the conveyor belt 15 rotates. Further, the driven roller 14B is paired with a roller 43, and supplies the fabric M onto the conveyor belt 15 while nipping the fabric M with the roller 43.

A printing unit 16 that performs printing on the fabric M conveyed along the first conveyance path T1 is disposed in the housing 11A as illustrated in FIG. 1. The printing unit 16 includes a print head 18. The print head 18 ejects a liquid such as ink supplied from a liquid container such as an ink cartridge or an ink tank, which is not illustrated, to the fabric M. The liquid container contains the same type of liquid as the liquid ejected by the print head 18. A liquid ejected by the print head 18 is not limited to ink, and includes a pretreatment liquid that is ejected before printing is performed on the fabric M, or a post-treatment liquid ejected after printing is performed on the fabric M. Thus, the printing process performed on the fabric M by the printing apparatus 11 may include a process of ejecting the pretreatment liquid, the post-treatment liquid, and the like onto the fabric M, in addition to the process of ejecting ink onto the fabric M.

For example, when the printing apparatus 11 performs color printing using N colors of ink, N liquid containers containing each of the N colors of ink are mounted on a mounting unit provided at a predetermined position in the printing apparatus 11. When the N colors are, for example, four colors, four liquid containers containing each of the four colors of ink including cyan, magenta, yellow, and black are mounted on the mounting unit. Color printing is not limited to printing in three colors or four colors, and may be printing in one color, two colors, or printing in five or more colors.

The printing apparatus 11 of this embodiment is a serial digital textile printer. The serial printing unit 16 includes a carriage 17 configured to be movable in the width direction X and the print head 18 fixed to the carriage 17. The print head 18 is fixed to the surface of the carriage 17 on the side facing the first conveyance path T1, and moves back and forth in the width direction X along the carriage 17. The print head 18 has a plurality of nozzles (not illustrated) that open on a nozzle surface that is a surface facing the fabric M.

The carriage 17 has a carriage motor 17M (see FIG. 5) as a drive source. The printing apparatus 11 includes a power transmission mechanism (not illustrated) that converts power of the carriage motor 17M into a linear motion of the carriage 17 in the width direction X. The power transmission mechanism is, for example, a belt-type power transmission mechanism. The carriage 17 is guided by a guide rail (not illustrated) to be movable in the width direction X. The carriage 17 is fixed to a portion of an endless timing belt constituting the belt-type power transmission mechanism, and the carriage motor 17M is driven by forward and reverse motion of the timing belt, and thus the carriage 17 moves back and forth in the width direction X.

The print head 18 is printed on the fabric M as a liquid such as ink is ejected from the nozzles while the carriage 17 is moving in the width direction X. One movement of the print head 18 in the width direction X will be referred to as one pass. An image or the like is printed on the fabric M based on print data PD by repeating a printing operation in which the carriage 17 moves in the width direction X and the print head 18 performs one pass or a plurality of passes of printing and a conveying operation in which the fabric M is conveyed to the next printing position in an alternating manner.

The printing apparatus 11 includes a maintenance unit 19 in the housing 11A as illustrated in FIG. 1. The maintenance unit 19 performs maintenance operations for the print head 18. One of the maintenance operations is cleaning. Cleaning is a process of cleaning the nozzles of the print head 18. The cleaning is a process of forcibly discharging foreign substances such as thickening ink, bubbles, and fiber powder from the nozzles by forcibly discharging a liquid such as ink from the nozzles of the print head 18. The maintenance unit 19 includes a cap (not illustrated) that can be brought in contact with the nozzle surface of the print head 18 to apply pressure or negative pressure on the nozzles to forcibly discharge a liquid such as ink. The waste liquid such as discharged ink is received in the cap, and collected in a waste liquid tank (not illustrated) through a tube, which is not illustrated, from the cap.

Cleaning is performed at a predetermined cleaning execution time. A condition for determining the cleaning execution time may be set as appropriate. For example, a cleaning execution time may be set to come after the predetermined time passes from a previous cleaning end time. Alternatively, a cleaning execution time may be set to come after printing of a predetermined time length is performed from the previous cleaning end time. Further, the print head 18 performs a blank ejection (also referred to as "flushing") in which ink in the nozzles is flushed by ejecting a liquid such as ink that is not related to printing, toward the cap of the maintenance unit 19 as one maintenance operation.

As a result, when the printing apparatus 11 performs printing on the fabric M, the fabric M is intermittently conveyed. In addition, when the cleaning execution time comes in the middle of printing on the fabric M, the printing apparatus 11 temporarily stops the printing while cleaning is performed, and conveyance of the fabric M is also stopped accordingly. Furthermore, when the image or the like to be printed on the fabric M is changed, the print data PD is changed. When the print data PD is changed, the conveyance of the fabric M is temporarily stopped as well. As described above, the operations of the printing apparatus 11 involve a temporary stop of the fabric M in the intermittent conveyance operation of the fabric M by the conveyor unit 13, the execution of maintenance including cleaning, and a change in the print data PD.

Further, the printing unit 16 may be of a line printing type instead of a serial printing type in which the print head 18 is movable in the width direction X along with the carriage 17. The line printing-type printing unit 16 includes the line-type print head 18 (so-called line head) having a plurality of nozzles in a range across the entire width of the assumed maximum width of the fabric M. In the line printing-type printing apparatus 11, the conveyor unit 13 conveys the fabric M at a constant speed. The print head 18 ejects a liquid such as ink from the nozzles to the fabric M conveyed at the constant speed to print an image or the like on the fabric M. In the operation of the line printing-type printing apparatus 11, there is no temporary stop of the conveyance operation attributable to the intermittent conveyance of the fabric M, but conveyance of the fabric M may be temporarily stopped at the time of execution of maintenance including cleaning and change in the print data PD.

Configuration of Drying Apparatus 20

Next, the drying apparatus 20 will be described with reference to FIG. 1. The drying apparatus 20 has a second conveyance path T2 as a path on which the fabric M is conveyed to pass through the housing 21 in the conveyance direction Y as illustrated in FIG. 1. Furthermore, the drying apparatus 20 includes a heater 22 that is a heat source to dry the fabric M in the housing 21. The heater 22 is housed in an air duct 23 disposed at a position above the second conveyance path T2 in the housing 21. A fan 24 is disposed in a portion that communicates with the outside of the housing 21 in the air duct 23. When the fan 24 is driven, air is taken into the air duct 23 from the outside of the housing 21, the air taken into the air duct is heated while passing through the heater 22, and the heated air is blown as hot air or warm air from the vent of the air duct 23 to the print surface of the fabric M on the second conveyance path T2.

Thus, the liquid such as ink printed on the fabric M in the printing apparatus 11 is dried while the fabric M is conveyed along the conveyance path T2 of the drying apparatus 20. Then, the fabric M with the dried liquid such as ink discharged from the drying apparatus 20 is supplied to the processing apparatus 30. A buffer unit 31 is provided between the drying apparatus 20 and the processing apparatus. In this example, the buffer unit 31 is included in the processing apparatus 30. Further, the buffer unit 31 may be included in the drying apparatus 20. In addition, a first roller pair 41 on the upstream among two roller pairs 41 and 42 constituting the buffer unit 31 may be included in the drying apparatus 20, and the second roller pair 42 on the downstream may be included in the processing apparatus 30. Further, the printing system 10 illustrated in FIG. 1 is provided with a roller 43 and a plurality of guide rollers 44 to 46 forming the conveyance path T in addition to the roller pairs 41 and 42.

Configuration of Processing Apparatus 30

Next, the processing apparatus 30 will be described with reference to FIGS. 1 to 4. The processing apparatus 30 illustrated in FIGS. 1 and 2 is an apparatus that performs processing for improving the texture of the fabric M that has finished with printing and drying. The processing apparatus 30 includes the above-described first vibration applying unit 32 and second vibration applying unit 33 that perform treatments for improving texture. The first vibration applying unit 32 is for roughing, and the second vibration applying unit 33 is for finishing.

The first vibration applying unit 32 is located on the upstream of the conveyance path T3 from the second vibration applying unit 33, and performs roughing process on the fabric M. The second vibration applying unit 33 is located on the downstream of the conveyance path T3 from the first vibration applying unit 32 and performs finishing process on the fabric M that has undergone the roughening process.

The first vibration applying unit 32 includes a pair of contact members 51 disposed at a position at which the members face each other having the third conveyance path T3 therebeween on which the fabric M is conveyed. In addition, the second vibration applying unit 33 includes a pair of contact members 55 disposed at a position at which the members face each other having the third conveyance path T3 therebetween.

The first vibration applying unit 32 performs the roughing process on the fabric M on which printing has been performed by the printing apparatus 11, by performing a vibration operation of sticking the fabric M with the pair of contact members 51 a plurality of times per second. The second vibration applying unit 33 performs the finishing process on the fabric M that has completed with the roughing process by performing a vibration operation of sticking the fabric M with the pair of contact members 55 a plurality of times per second. Further, in this embodiment, the contact members 51 will also be referred to as first contact members 51 and the contact members 55 will also be referred to as second contact members 55.

Furthermore, the processing apparatus 30 includes tension adjustment units 34 and 35 capable of adjusting tension acting on the processed fabric M. The first tension adjustment unit 34 can adjust a tension acting on the portion of the fabric M processed by the first vibration applying unit 32. The second tension adjustment unit 35 can adjust a tension acting on the portion of the fabric M processed by the second vibration applying unit 33.

Furthermore, the processing apparatus 30 includes heating units 36 and 37 that heats the fabric M after printing is performed thereon by the printing apparatus 11 and the fabric M before being processed by the processing apparatus 30. The first heating unit 36 heats the portion of the fabric M before being processed by the first vibration applying unit 32. The second heating unit 37 heats the portion of the fabric M to be processed by the second vibration applying unit 33.

Furthermore, the processing apparatus 30 includes a cleaning unit 39 that cleans the fabric M after the fabric M is processed by the processing apparatus 30. The cleaning unit 39 includes removal members 91 and 92 that clean the fabric M while in contact with the fabric M. Further, the processing apparatus 30 includes a collecting unit 94 that collects fiber powder and the like generated from cleaning by the cleaning unit 39. The collecting unit 94 includes a first collector 95 that collects fiber powder and the like generated from cleaning by the first removal member 91, and a second collector 96 that collects fiber powder and the like generated from cleaning by the second removal member 92.

Detailed configurations of the vibration applying units 32 and 33, the tension adjustment units 34 and 35, the heating units 36 and 37, the cleaning unit 39, and the like will be described below. First, a detailed configuration of the vibration applying units 32 and 33 will be described.

Configuration of First Vibration Applying Unit 32

Figure 3:
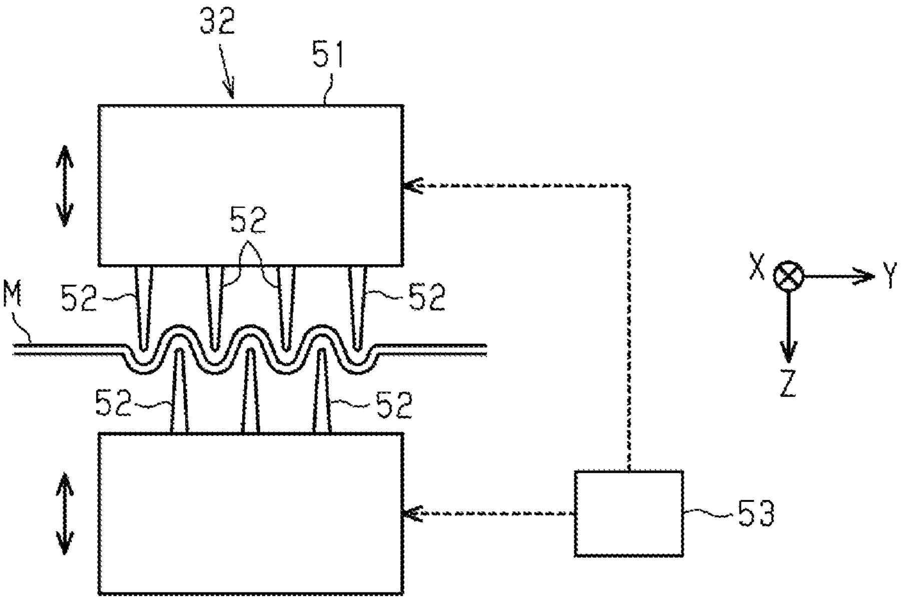
FIG. 3 is a schematic side view illustrating a first vibration applying unit.

First, a configuration of the first vibration applying unit 32 will be described with reference to FIG. 3. The first vibration applying unit 32 includes the contact members 51 having a plurality of protrusions 52 that come in contact with the fabric M on which printing has been performed by the printing apparatus 11, and a vibration generating source 53 that applies vibration to the contact members 51 as illustrated in FIG. 3. With application of vibration from the vibration generating source 53, the pair of contact members 51 vibrate with displacement in the Z axis direction, which is the direction intersecting the print surface of the fabric M. Due to the vibration applied, the pair of contact members 51 repeats approach to and separation from the fabric M in the Z axis direction. The pair of contact members 51 may repeat approach to and separation from the fabric M approximately at the same timings. In addition, the pair of contact members 51 may repeat approach to and separation from the fabric M at different timings.

The protrusions 52 have a cylindrical shape or a rod shape such as a needle shape with a sharp tip. In a case that the protrusions 52 have a rod shape, the print surface and the back surface of the fabric M are stuck with the protrusions 52 when the pair of contact members 51 approach the fabric M, and thereby the portion of the fabric M including the ink layer would be torn. In addition, when a resin layer is formed for the purpose of smoothing the printed surface (surface) of the fabric M, the resin layer that is the lower layer of the ink layer would also be torn. In such roughing, the ink layer and the resin layer that contribute to the hardness of the fabric M with printing would be torn. However, the ink layer is torn to an extent that bleeding (blurring) or the like caused by powder from tearing of the ink layer diffused in the surroundings will not be a problem.

Figure 5:
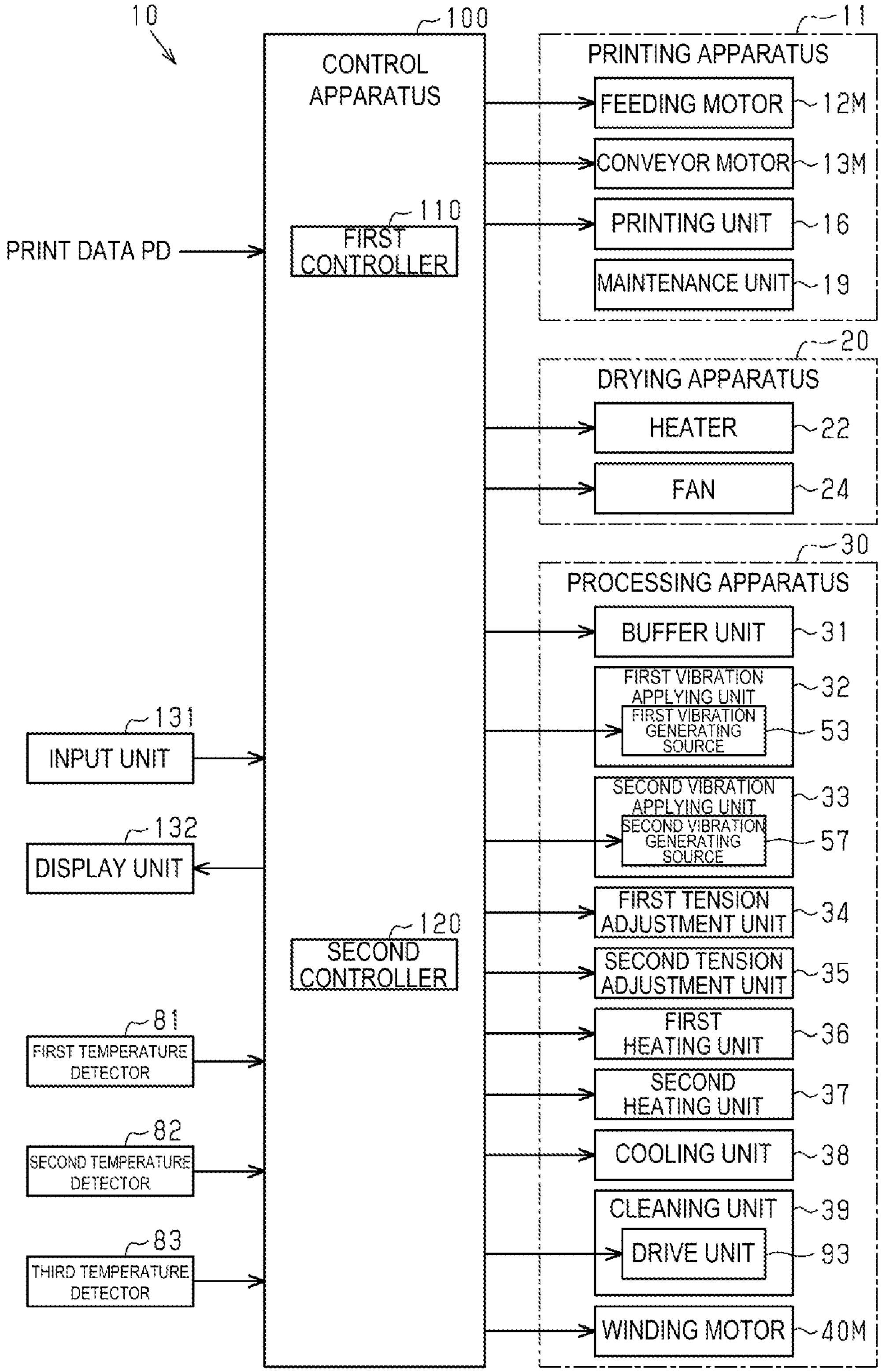
FIG. 5 is a block diagram illustrating an electrical configuration of the printing system.

Driving of the vibration generating source 53 is controlled by the control apparatus 100 (see FIG. 5). As driving of the vibration generating source 53 is controlled, the vibration applied to the pair of contact members 51 is controlled. Specifically, the control apparatus 100 controls at least one of amplitude and frequency of the vibration applied to the pair of contact members 51. The control apparatus 100 may control both amplitude and frequency of the vibration applied to the pair of contact members 51.

The control apparatus 100 may control amplitude of the pair of contact members 51 in the range of, for example, 1 to 10 mm. In addition, the control apparatus 100 may control frequency of the pair of contact members 51 in the range of, for example, 1 to 1000 Hz. Further, amplitude and frequency of the pair of contact members 51 are not limited to these numerical ranges, and may be controlled at values other than the range described above. In addition, the contact members 51 to which vibration is applied are not limited to being a pair. For example, a configuration including a non-vibrating platform and a contact member 51 disposed at a position facing the platform having the third conveyance path T3 therebetween may be employed. Further, the control apparatus 100 may have a configuration in which only the amplitude of the contact members 51 is controlled, a configuration in which only the frequency of the contact members 51 is controlled, a configuration in which the contact members 51 are driven only with a predetermined amplitude, and a configuration in which the contact members 51 are driven only with a predetermined frequency.

Configuration of Second Vibration Applying Unit 33

Figure 4:
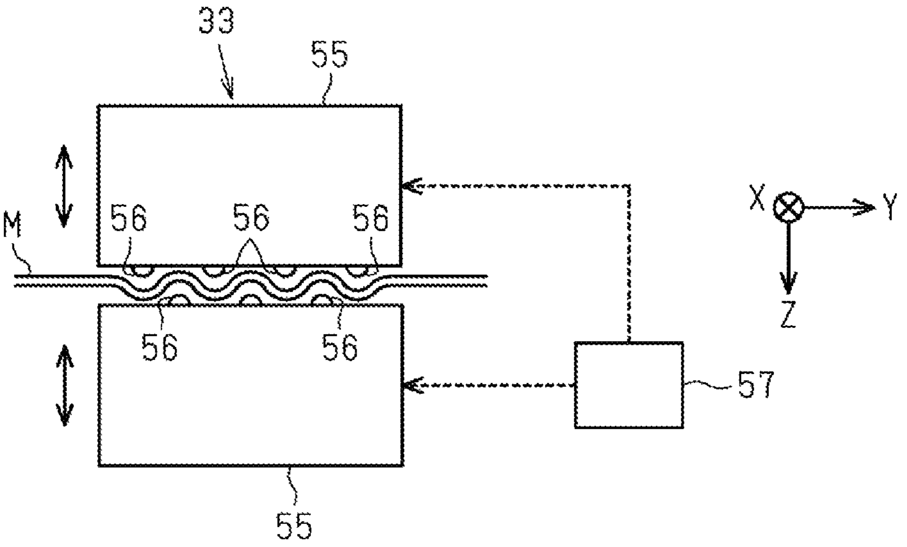
FIG. 4 is a schematic side view illustrating a second vibration applying unit.

Next, a configuration of the second vibration applying unit 33 will be described with reference to FIG. 4. The second vibration applying unit 33 includes the contact members 55 having a plurality of protrusions 56 that come in contact with the fabric M on which printing has been performed by the printing apparatus 11, and a vibration generating source 57 that applies vibration to the contact members 55 as illustrated in FIG. 4. With application of vibration from the vibration generating source 57, the pair of contact members 55 vibrate with displacement in the Z axis direction, which is the direction intersecting the print surface of the fabric M. Due to the vibration applied, the pair of contact members 55 repeats approach to and separation from the fabric M in the Z axis direction. The pair of contact members 55 may repeat approach to and separation from the fabric M approximately at the same timings. In addition, the pair of contact members 55 may repeat approach to and separation from the fabric M at different timings.

The protrusions 56 have a rounded surface shape such as a convex spherical shape or a wavy curved surface shape. Since the protrusions 56 have a rounded surface shape, when the pair of contact members 55 approach the fabric M, the protrusions 56 smooth the rough surface of the fabric M after roughing. In other words, the protrusions 56 smooth the rough-machined surface of the ink layer and the resin layer of the fabric M damaged in the roughing and performs finishing to finish the surface layer of the fabric M to have desired texture.

Driving of the vibration generating source 57 is controlled by the control apparatus 100 (see FIG. 5). As driving of the vibration generating source 57 is controlled, the vibration applied to the pair of contact members 55 is controlled. Specifically, the control apparatus 100 controls at least one of amplitude and frequency of the vibration applied to the pair of contact members 55. The control apparatus 100 may control both amplitude and frequency of the vibration applied to the pair of contact members 55.

The control apparatus 100 may control amplitude of the pair of contact members 55 in the range of, for example, 1 to 10 mm. In addition, the control apparatus 100 may control frequency of the pair of contact members 55 in the range of, for example, 1 to 1000 Hz. Further, amplitude and frequency of the pair of contact members 55 are not limited to these numerical ranges, and may be controlled at values other than the range described above.

In addition, the contact members 55 are not limited to being a pair, similarly to the contact members 51 for roughing. For example, a platform and the contact members 55 may be combined. Further, the control apparatus 100 may have a configuration in which only the amplitude of the contact members 55 is controlled, a configuration in which only the frequency of the contact members 55 is controlled, a configuration in which the contact members 55 are driven only with a predetermined amplitude, and a configuration in which the contact members 55 are driven only with a predetermined frequency.

Furthermore, the control apparatus 100 may control driving of the vibration generating sources 53 and 57 in a condition where the vibration applied to the second contact members 55 is smaller than the vibration applied to the first contact members 51. For example, the control apparatus 100 may control driving of the vibration generating sources 53 and 57 in a condition where the amplitude of the vibration applied to the second contact members 55 is smaller than the amplitude of the vibration applied to the first contact members 51. Furthermore, the control apparatus 100 may control driving of the vibration generating sources 53 and 57 in a condition where the frequency of the vibration applied to the second contact members 55 is lower than the frequency of the vibration applied to the first contact members 51.

Configuration of Tension Adjustment Units 34 And 35

Next, a configuration of the tension adjustment units 34 and 35 will be described with reference to FIG. 2. The first tension adjustment unit 34 adjusts the tension acting on the portion of the fabric M processed by the first vibration applying unit 32 as illustrated in FIG. 2. The first tension adjustment unit 34 includes a set of roller pairs 61 and 62 arranged at respective positions between which the portion of the fabric M to which the first vibration applying unit 32 applies vibration is disposed in the conveyance direction Y. The first tension adjustment unit 34 includes a motor 61M that drives the roller pair 61 and a motor 62M that drives the roller pair 62. The control apparatus 100 controls driving of the motors 61M and 62M such that a difference in conveyance speed at which the set of roller pairs 61 and 62 is conveyed is made to adjust the tension of the portion of the fabric M facing the contact members 51.

The second tension adjustment unit 35 can adjust the tension acting on the portion of the fabric M processed by the second vibration applying unit 33. The second tension adjustment unit 35 includes a set of roller pairs 65 and 66 arranged at respective positions between which the portion of the fabric M to which the second vibration applying unit 33 applies vibration is disposed in the conveyance direction Y. The second tension adjustment unit 35 includes a motor 65M that drives the roller pair 65 and a motor 66M that drives the roller pair 66. The control apparatus 100 controls driving of the motors 65M and 66M such that a difference in conveyance speed at which the set of roller pairs 65 and 66 is conveyed is made to adjust the tension of the portion of the fabric M facing the contact members 55.

Configuration of Heating Units 36 And 37

Next, a configuration of heating units 36 and 37 will be described with reference to FIG. 2. As illustrated in FIG. 2, the heating units 36 and 37 utilize exhaust heat of the drying apparatus 20 (see FIG. 1) as a heat source. The processing apparatus 30 includes an exhaust heat system 70 that uses exhaust heat of the drying apparatus 20. The exhaust heat system 70 includes an exhaust heat duct 71 extending from the inside of the drying apparatus 20, and an exhaust heat fan 72 provided in the middle of the exhaust heat duct 71. The exhaust heat of the drying apparatus 20 is supplied to the processing apparatus 30 by driving the exhaust heat fan 72.

The first heating unit 36 includes a first supply duct part 73 that branches from the exhaust heat duct 71, and a first heating fan 74 disposed within the first supply duct part 73. The first supply duct part 73 has an air blowing port 73A at the leading end portion. The air blowing port 73A faces the portion of the fabric M before being processed by the first vibration applying unit 32. The first heating unit 36 heats the portion of the fabric M before being processed by the first vibration applying unit 32 with hot air blown out from the air blowing port 73A by driving the first heating fan 74. In this way, the first heating unit 36 can heat the portion of the fabric M that the first vibration applying unit 32 will be processed by using exhaust heat of the drying apparatus 20. That is, the first heating unit 36 heats the portion of the fabric M that has been processed with printing by the printing apparatus 11, drying by the drying apparatus 20 to dry the fabric M, and that will be processed by the first vibration applying unit 32. Further, a collection duct part 79A for collecting the hot air from the air blowing port 73A is disposed at a position facing the air blowing port 73A having the conveyance path T3 therebetween.

The processing apparatus 30 includes a first temperature detector 81 that detects a temperature of the portion of the fabric M heated by the first heating unit 36. The control apparatus 100 controls temperature to which the fabric M will be heated with hot air blown out from the air blowing port 73A by controlling a rotational speed of the first heating fan 74 based on a detection temperature of the first temperature detector 81. Further, the first heating unit 36 is not limited to the configuration of blowing hot air, and may heat the portion of the fabric M before being processed by the first vibration applying unit 32 with radiant heat from a heat source such as a heater.

The second heating unit 37 includes a second supply duct part 75 that branches from the exhaust heat duct 71, and a second heating fan 76 disposed within the second supply duct part 75. The second supply duct part 75 has an air blowing port 75A at the leading end portion. The air blowing port 75A faces the portion of the fabric M before being processed by the second vibration applying unit 33. The second heating unit 37 heats the portion of the fabric M before being processed by the second vibration applying unit 33 with hot air blown out from the air blowing port 75A by driving the second heating fan 76. In this way, the second heating unit 37 can heat the portion of the fabric M that the second vibration applying unit 33 will be processed by using exhaust heat of the drying apparatus 20. Further, a collection duct part 79B for collecting the hot air from the air blowing port 75A is disposed at a position facing the air blowing port 75A having the conveyance path T3 therebetween.

The processing apparatus 30 includes a second temperature detector 82 that detects a temperature of the portion of the fabric M heated by the second heating unit 37. The control apparatus 100 controls temperature to which the fabric M will be heated with hot air blown out from the air blowing port 75A by controlling a rotational speed of the second heating fan 76 based on a detection temperature of the second temperature detector 82. Further, the second heating unit 37 is not limited to the configuration of blowing hot air, and may heat the portion of the fabric M before being processed by the second vibration applying unit 33 with radiant heat from a heat source such as a heater.

In addition, as illustrated in FIG. 2, the processing apparatus 30 includes a cooling unit 38 that cools the fabric M at a position upstream of the first heating unit 36 in the conveyance direction Y. The cooling unit 38 includes a cooling duct part 77 that captures outside air from the outside of the housing 30A, and a cooling fan 78 disposed in the cooling duct part 77. The cooling duct part 77 has an air blowing port 77A at the leading end portion. The air blowing port 77A is located upstream of a first heating position at which heating is performed by the first heating unit 36 in the conveyance direction Y. The cooling unit 38 cools the portion of the fabric M, which has been heated in the drying process by the drying apparatus 20 (see FIG. 1) and reached at a predetermined temperature higher than room temperature, to a temperature closer to room temperature before being heated by the first heating unit 36. Cooling makes it easier to control the temperature of the heated fabric M because the first heating unit 36 start heating of the fabric M from the predetermined temperature close to room temperature at all times, regardless of the heating temperature of the drying apparatus 20. Further, a third collection duct part 79C for collecting cold air from the air blowing port 77A is disposed at a position facing the air blowing port 77A having the conveyance path T3 therebetween. The hot air or cold air collected from each of the collection duct parts 79A, 79B, and 79C passes through a collection duct 79, is incorporated in the exhaust heat duct 71, and then is discharged to the outside through a duct (not illustrated) that is piped inside the factory.

Configuration of Cleaning Unit 39

Next, a configuration of the cleaning unit 39 will be described with reference to FIG. 2. The cleaning unit 39 includes the removal members 91 and 92 that clean the fabric M while in contact with the fabric M as illustrated in FIG. 2. The first removal member 91 cleans the fabric M while in contact with the print surface of the fabric M. The second removal member 92 cleans the fabric M while in contact with the back surface, which is the surface opposite to the print surface of the fabric M. In the example illustrated in FIG. 2, the removal members 91 and 92 are rotary brushes. The cleaning unit 39 includes a drive unit 93 (see FIG. 5) that drives the removal members 91 and 92. The removal members 91 and 92 have a width dimension that allows the entire region of the fabric M in the width direction X to be cleaned assuming that the fabric M having a maximum width. When the removal members 91 and 92 are rotary brushes, bristles are formed at the outer circumferential surfaces of the cylindrical brushes as if helixes in the opposite directions are depicted on both sides from the width center, and fiber powder is guided toward the outside of the fabric M in the width direction X while the members are rotating.

The pair of rotating brushes rotates, for example, in contact with both surfaces of the fabric M, and removes foreign matters such as fiber powder from both surfaces (processed surfaces) of the fabric M. The rotating brushes may be configured such that the rotational speed at which the brushes rotate can be adjusted while in contact with the processed surface of the fabric M. In this case, the control apparatus 100 may perform control such that the rotational speed of the rotating brushes becomes higher as a processing strength, which is determined based on an amplitude and a frequency of vibration applied to the contact members 51 and 55 by the vibration applying units 32 and 33, increases so that more fiber powder is generated.

Furthermore, the cleaning unit 39 includes a collecting unit 94 that collects the fiber powder generated by the removal members 91 and 92 cleaning the fabric M. The collecting unit 94 includes a first collector 95 that collects the fiber powder generated when the first removal member 91 cleans the print surface of the fabric M, and a second collector 96 that collects the fiber powder generated when the second removal member 92 cleans on the back surface of the fabric M.

The first collector 95 includes a collection duct 95A having a suction port facing the print surface of the fabric M at a position downstream of the cleaning position at which the first removal member 91 can come in contact with the fabric M in the conveyance direction Y and a dust box 95B disposed in the middle of the collection duct 95A. The first collector 95 includes a fan 97 and a filter 98 at a position downstream of the dust box 95B inside the collection duct 95A in the air flow direction. The fiber powder is suctioned into the collection duct 95A from the print surface of the fabric M via the suction port by the suction force generated by rotating the fan 97, and the suctioned fiber powder is collected in the dust box 95B. In addition, the airflow suctioned into the collection duct 95A is filtered out by the filter 98, and then discharged from the processing apparatus 30.

The second collector 96 basically has the same configuration as the first collector 95. The second collector 96 includes a collection duct 96A having a suction port facing the back surface of the fabric M at a position downstream of the cleaning position of the second removal member 92 in the conveyance direction Y, and a dust box 96B, a fan 97, and a filter 98 disposed within the collection duct 96A. The fiber powder is suctioned into the collection duct 96A from the back surface of the fabric M via the suction port by the suction force generated by rotating the fan 97, and the suctioned fiber powder is collected in the dust box 96B. In addition, the airflow suctioned into the collection duct 96A is filtered out by the filter 98, and then discharged from the processing apparatus 30.

Electrical Configuration of Printing System 10

Next, an electrical configuration of the printing system 10 will be described with reference to FIG. 5.

As illustrated in FIG. 5, the control apparatus 100 is electrically coupled to the printing apparatus 11, the drying apparatus 20, and the processing apparatus 30. The control apparatus 100 controls the printing apparatus 11, the drying apparatus 20, and the processing apparatus 30. The feeding motor 12M, the conveyor motor 13M, the printing unit 16, and the maintenance unit 19 constituting the printing apparatus 11 are electrically coupled to the control apparatus 100. The control apparatus 100 controls operations of the printing apparatus 11 by controlling the feeding motor 12M, the conveyor motor 13M, the printing unit 16, and the maintenance unit 19.

In addition, the control apparatus 100 is electrically coupled to the heater 22 and the fan 24 constituting the drying apparatus 20. The control apparatus 100 controls the temperature to which the drying apparatus 20 heats the fabric M by controlling at least one of the temperature of the heater 22 and the rotational speed of the fan 24.

As illustrated in FIG. 5, the buffer unit 31, the vibration applying units 32 and 33, the tension adjustment units 34 and 35, the heating units 36 and 37, the cooling unit 38, the cleaning unit 39, and a winding motor 40M constituting the processing apparatus 30 are electrically coupled to the control apparatus 100. The control apparatus 100 controls operations of the processing apparatus 30 by controlling the buffer unit 31, the vibration applying units 32 and 33, the tension adjustment units 34 and 35, the heating units 36 and 37, the cooling unit 38, the cleaning unit 39, and the winding motor 40M.

The control apparatus 100 controls the first vibration generating source 53 when controlling the first vibration applying unit 32, and thus can control at least one of the amplitude and frequency of the vibration to be applied to the contact members 51. In addition, the control apparatus 100 controls the second vibration generating source 57 when controlling the second vibration applying unit 33, and thus can control at least one of the amplitude and frequency of the vibration to be applied to the contact members 55.

As illustrated in FIG. 5, when controlling the first tension adjustment unit 34, the control apparatus 100 controls the rotational speeds of the motors 61M and 62M (see FIG. 2) separately and thus can adjust the tension to be applied to the portion of the fabric M to be processed by the first contact members 51. In addition, when controlling the second tension adjustment unit 35, the control apparatus 100 controls the rotational speeds of the motors 65M and 66M (see FIG. 2) separately and thus can adjust the tension to be applied to the portion of the fabric M to be processed by the second contact members 55.

As illustrated in FIG. 5, the control apparatus 100 controls the first heating unit 36 such that the portion of the fabric M to be processed by the first contact members 51 is heated at a position upstream of the processing position in the conveyance direction Y. In addition, the control apparatus 100 controls the second heating unit 37 such that the portion of the fabric M to be processed by the second contact members 55 is heated at a position upstream of the processing position in the conveyance direction Y. The heating units 36 and 37 of this embodiment utilize exhaust heat of the drying apparatus 20, and thus the temperature of the exhaust heat depends on the heating temperature required to the drying apparatus 20. For this reason, the control apparatus 100 controls the rotational speeds of the fans 74 and 76 (see FIG. 2) so that the heating units 36 and 37 can heat the fabric M to the required temperature even when the temperature of the exhaust heat, that is, the heating temperature of the drying apparatus 20, is changed.

Furthermore, the control apparatus 100 controls the cooling unit 38 such that the temperature of the portion of the fabric M supplied to the processing apparatus 30 from the drying apparatus 20 is temporarily cooled. This operation causes the temperature of the fabric M to be reset to a temperature in range near room temperature (e.g., a predetermined temperature range of 20 to 50° C.) before the first heating unit 36 heats the fabric M. By resetting the temperature of the fabric M to a temperature within the predetermined temperature range by cooling, the temperature of the fabric M when being heated by the first heating unit 36 can be easily controlled.

As illustrated in FIG. 5, the cleaning unit 39 includes the drive unit 93 that drives the removal members 91 and 92. The drive unit 93 is, for example, a motor in the present example in which the removal members 91 and 92 are rotary brushes. When controlling the cleaning unit 39, the control apparatus 100 controls the drive unit 93 such that the cleaning strength at the time of cleaning the fabric M, for example, the rotational speeds or rotational torque of the removal members 91 and 92, is adjusted. Further, the control apparatus 100 may control the fan 97 such that the cleaning strength at the time of cleaning the fabric M, for example, the suction force of the fan 97, is adjusted. That is, the control apparatus 100 may control at least one of the drive unit 93 and the fan 97 such that the cleaning strength when cleaning the fabric M is adjusted.

Furthermore, the control apparatus 100 controls the feeding motor 12M, the conveyor motor 13M, the motors 61M, 62M, 65M, and 66M, and the winding motor 40M, which are the drive sources of the conveyance system, separately such that the fabric M is controlled at required speeds (including a stop) in each of units between the feeding unit 12 and the winding unit 40.

The control apparatus 100 controls the motors 41M and 42M (see FIG. 2) constituting the buffer unit 31 at the same speed such that the portion of fabric M in the processing apparatus 30 is conveyed at the same conveyance speed as the conveyance speed of the fabric M in the printing apparatus 11 and the drying apparatus 20. Furthermore, the control apparatus 100 stops the motor 41M and then drive the motor 42M and thus the operation of the processing apparatus 30 can continue even when the operation of the printing apparatus 11 is stopped until there is no slack of the fabric M in the buffer unit 31.

As illustrated in FIG. 5, the printing system 10 includes an input unit 131 that is operated for an operator to input information, a display unit 132 that displays a menu, or the like. The input unit 131 and the display unit 132 are electrically coupled to the control apparatus 100. The input unit 131 enables to select information of the strength with which the cleaning unit 39 performs cleaning and to receive information input.

In addition, the first temperature detector 81, the second temperature detector 82, and a third temperature detector 83 are electrically coupled to the control apparatus 100. The control apparatus 100 controls the first heating unit 36 based on a temperature detection value detected by the first temperature detector 81 such that the temperature of the portion of the fabric M to be processed by the first contact members 51 is adjusted to a required temperature. The control apparatus 100 controls the second heating unit 37 based on a temperature detection value detected by the second temperature detector 82 such that the temperature of the portion of the fabric M to be processed by the second contact members 55 is adjusted to a required temperature. The control apparatus 100 controls the cooling unit 38 based on a temperature detection value detected by the third temperature detector 83 such that the temperature of the portion of the fabric M positioned upstream of the heating position at which the first heating unit 36 performs heating in the conveyance direction Y to be reset to a value within the temperature range near room temperature.

As illustrated in FIG. 5, the control apparatus 100 includes a first controller 110 that controls the printing apparatus 11 mainly, and a second controller 120 that controls the processing apparatus 30 mainly. Although the control apparatus 100 may include a third controller (not illustrated) that controls the drying apparatus 20, the first controller 110 may control the drying apparatus 20. The control apparatus 100 of this embodiment controls operations of the processing apparatus 30 in response to operations of the printing apparatus 11.

Furthermore, although the configuration in which the printing system 10 includes one control apparatus 100 is introduced in the example illustrated in FIG. 5, a configuration with two control apparatuses including a first control apparatus including the first controller 110 and a second control apparatus including the second controller 120 may be adopted. In this case, the second control apparatus may control operations of the processing apparatus 30 in response to operations of the printing apparatus 11 based on information about the operations of the printing apparatus 11 received from the first control apparatus.

The control apparatus 100 controls the operations of the printing apparatus 11 based on the input print data PD. The print data PD includes printing condition information and print image data. The printing condition information includes fabric-related information including the type, size, thickness, and the like of the fabric M, information of the number of passes of the print head 18, and the like. Here, the type of fabric M refers to a material, such as the type of fiber composing the fabric M. The first controller 110 calculates the average ink application amount per unit area of the fabric M when the print head 18 ejects ink on the fabric M based on print image data. In this embodiment, when it is described that the control apparatus 100 controls the operations of the processing apparatus 30 in accordance with the average ink application amount per unit area of the fabric M, the average ink application amount per unit area of the fabric M may be simply referred to as an "amount of ink".

Detailed Control of Control Apparatus 100

Next, detailed control of the control apparatus 100 over operations of the processing apparatus 30 will be described. The control apparatus 100 controls operations of the processing apparatus 30 in accordance with operations of the printing apparatus 11. The operations of the printing apparatus 11 include a stop operation required for printing. The stop operation of the printing apparatus 11 leads to a stop of conveyance of the fabric M, and thus the control apparatus 100 performs stop in association with the processing apparatus 30 when necessary. In addition, the control apparatus 100 controls the operations of the processing apparatus 30 in accordance with a value of a parameter included in the printing condition information. Examples of the parameter include the type of fabric M, the thickness of the fabric M, the average ink application amount (amount of ink), and the like. Detailed control of the control apparatus 100 over the processing apparatus 30 will be described below.

The printing system 10 of this embodiment conveys the fabric M in the roll-to-roll method. The conveyed fabric M sequentially undergoes printing by the printing apparatus 11, drying by the drying apparatus 20, and processing (e.g., texture improvement processing) by the processing apparatus 30 in this order.

When printing is performed on the same type of fabric M under the same printing conditions, the processing apparatus 30 processes the fabric M at the same processing speed (e.g., frequency) and processing strength (e.g., amplitude). When the fabric M that printing and drying have been completed is supplied to the processing apparatus 30 at a constant speed, the processing apparatus 30 may perform processing on the fabric M at the same processing speed and processing strength. However, the speed of the fabric M fed by the printing apparatus 11 changes in accordance with an operation of the printing apparatus 11. The speed of the fabric M supplied to the processing apparatus 30 changes in accordance with an operation of the printing apparatus 11. When the processing apparatus 30 continues processing at the same processing speed and processing strength, the degree of processing applied to the fabric M is changed in accordance with the change in the conveyance speed. For example, when the printing apparatus 11 temporarily stops feeding the fabric M in accordance with an operation required for printing, if the processing apparatus 30 continues to perform processing on the fabric M at the same processing speed and processing strength, the processing repetitive at the same position of the stopped fabric M. This causes excess processing to the fabric M.

For this reason, the control apparatus 100 controls the operation of the processing apparatus 30 in accordance with the operation of the printing apparatus 11. Specifically, the control apparatus 100 changes at least one of the strength and the speed of the processing performed by the processing apparatus 30 on the fabric M in accordance with the operations of the printing apparatus 11. While the printing apparatus 11 performs a first operation in which the fabric M is conveyed at a first conveyance speed V1, the control apparatus 100 controls the processing apparatus 30 at a first processing strength and a first processing speed in accordance with the first operation of the printing apparatus 11. On the other hand, while the printing apparatus 11 performs a second operation in which the fabric M is conveyed at a second conveyance speed V2 (including a stop at V2=0) that is different from the first conveyance speed V1, the control apparatus 100 controls the processing apparatus 30 at a second processing strength and a second processing speed in accordance with the second operation of the printing apparatus 11. Here, at least one of the second processing strength and the second processing speed may have a different value from the first processing strength and the first processing speed. Further, in the example in which the process performed on the fabric M is controlled with the vibration applied to the contact members 51 and 55, the processing strength corresponds to amplitude, and the processing speed corresponds to frequency.

The control apparatus 100 controls the vibration applying units 32 and 33 as follows. While the printing apparatus 11 performs the first operation in which the fabric M is conveyed at the first conveyance speed V1, the control apparatus 100 causes the processing apparatus 30 to perform a vibration applying operation at a first amplitude and a first frequency in accordance with the first operation of the printing apparatus 11. While the printing apparatus 11 performs the second operation in which the fabric M is conveyed at the second conveyance speed V2 (including a stop in which the conveyance speed is zero) that is different from the first conveyance speed V1, the control apparatus 100 causes the processing apparatus 30 to perform a vibration applying operation at a second amplitude and a second frequency obtained by changing at least one of the first amplitude and the first frequency in accordance with the second operation of the printing apparatus 11. Here, at least one of the second amplitude and the second frequency has a different value from the first amplitude and the first frequency.

In the printing system 10 that continuously performs printing and processing on the fabric M conveyed in the roll-to-roll method, the degree of processing performed by the processing apparatus 30 on the fabric M can be set to be uniform, regardless of the operation of the printing apparatus 11.

The second operation in which the printing apparatus 11 stops (V2=0) or shifts (V1=V2 is not satisfied) the conveyance of the fabric M includes the following cases.

(a) A conveyance stop operation associated with intermittent conveyance when the printing apparatus 11 is a serial printer (b) A shift operation resulting from a change in the number of passes when the printing apparatus 11 is a serial printer (c) A conveyance stop operation due to maintenance (d) A conveyance stop operation at the time of replacing print data The above-described (a) to (d) will be described below.

In (a) described above, in the serial printing method, the fabric M is intermittently conveyed. That is, a printing operation in which printing is performed for one row (one pass of printing) by ejecting ink from the print head 18 while the fabric M is stopped and the carriage 17 is moved in the width direction X and a conveyance operation in which the fabric M is conveyed to the next printing position are alternately performed. The conveyance operation in which the fabric M is conveyed to the next printing position corresponds to the first operation, and the printing operation in which the fabric M is stopped in the period in which the print head 18 is moved in the width direction X and printing is performed corresponds to the second operation. The control apparatus 100 reduces at least one of the amplitude and frequency of the vibration during a stop period in which the conveyance of the fabric M is stopped in intermittent conveyance. For example, when an operation of the printing apparatus 11 (intermittent conveyance operation) switches from the first operation (conveyance) to the second operation (stop), the control apparatus 100 performs control such that the processing apparatus 30 stops the conveyance of the fabric M, and at least one of the amplitude and frequency of the vibration applied to the fabric M by the vibration applying units 32 and 33 is reduced. For example, the control apparatus 100 may reduce both the amplitude and frequency of the vibration to zero to stop the vibration.

In (b) described above, the number of passes is set according to a request such as a printing resolution in the serial printing method. The operator sets the number of passes according to a required print resolution. Here, an operation in which the print head 18 is moved one time in the width direction X during printing will be referred to as "one pass". The number of passes refers to the number of movements of the print head 18 required to perform printing on the fabric M in the unit of length in the conveyance direction Y. The conveyance distance of the fabric M conveyed every one pass becomes shorter as the printing resolution becomes higher. For this reason, as the number of passes increases, the feeding amount at one time of the intermittent conveyance becomes shorter, and as a result the average conveyance speed decreases. That is, by changing from a first number of passes to a second number of passes, the average conveyance speed is switched from the first conveyance speed V1 to the second conveyance speed V2. The control apparatus 100 switches the conveyance speed at which the processing apparatus 30 conveys the fabric M from the first conveyance speed V1 to the second conveyance speed V2, and controls at least one of the amplitude and frequency of the vibration applied by the vibration applying units 32 and 33 to the fabric M. If a shift from the first conveyance speed V1 to the second conveyance speed V2 is deceleration (V1>V2), at least one of the amplitude and frequency of the vibration is reduced. On the other hand, if a shift from the first conveyance speed V1 to the second conveyance speed V2 is acceleration (V1<V2), the control apparatus 100 increases at least one of the amplitude and frequency of the vibration.

In (c) described above, the printing apparatus 11 performs cleaning when a predetermined cleaning time comes during printing. The cleaning is an operation in which the print head 18 is moved to the home position, the cap of the maintenance unit 19 is brought in contact with or close to the print head 18 to forcibly discharge the ink from the nozzles of the print head 18 for cleaning. Through cleaning, foreign substances such as thickened ink in the nozzles or bubbles in the ink are forcibly discharged. By performing cleaning, printing errors caused by defective ejection of the print head 18 can be avoided or resolved. When cleaning is performed, neither printing operation nor conveyance of the fabric M is stopped. The operation of printing when cleaning is not performed corresponds to the first operation, and the cleaning operation in which cleaning is performed corresponds to the second operation. If the printing apparatus 11 switches to the cleaning operation (second operation) when the cleaning time comes, the control apparatus 100 gives a command to the processing apparatus 30 to stop the conveyance of the fabric M and stop the vibration applied to the fabric M by the vibration applying units 32 and 33.

In (d) described above, when printing content such as design performed by the printing apparatus 11 on the fabric M is to be changed, the operator operates the input unit 131 to change the print data PD. During the operation of changing the print data PD, the printing operation of the printing apparatus 11 is temporarily stopped. The carriage 17 moves to the home position, and the print head 18 is capped with the cap of the maintenance unit 19. When the print data PD is to be changed, the conveyance of the fabric M is stopped by stopping the printing operation. The printing operation corresponds to the first operation, and the change operation of the print data PD corresponds to the second operation. The change operation of the print data PD refers to a series of processing operations of a temporary stop of the printing operation based on the current print data PD by the operator, a change operation to change to the next print data PD by the operator, and reception of a printing restart operation. Upon receiving an instruction to change the print data PD from the input unit 131, the control apparatus 100 switches to a series of print data change processing (second operation) including a stop of the printing operation based on the current print data PD. When the operation transitions to the print data change processing, the control apparatus 100 gives a command to the processing apparatus 30 to stop the conveyance of the fabric M and stop the vibration applied to the fabric M by the vibration applying units 32 and 33.

Control According to Type of Fabric M

Next, control of the control apparatus 100 over the processing apparatus 30 in accordance with the type of fabric M will be described. The control apparatus 100 performs at least one of control of vibration applied by the vibration applying units 32 and 33, control of tension by the tension adjustment units 34 and 35, and control of the heating temperature of the heating units 36 and 37 in accordance with the type of fabric M. The control apparatus 100 may perform, for example, all of these three kinds of control. Here, the type of fabric M includes cotton, wool, silk, synthetic fiber, and the like. The synthetic fiber further is a type of fabric M depending on the difference in material such as polyester. The type of fabric M is also a fabric M including a synthetic resin between fibers among cotton, wool, silk, synthetic fibers, and the like. The type of fabric M may be determined by, for example, inputting information to the control apparatus 100 by the user via an operation unit such as a touch panel or transmitting measurement results of a measurement unit that measures the characteristics of the fabric M such as a camera to the control apparatus 100.

Control of Vibration Applying Units 32 and 33 over Vibration

Fabric M differs in hardness depending on the difference in cloth material, cloth thickness, cloth mesh density, fiber thickness, and the like. Here, the type of fabric M may be a type for determining hardness of the fabric M based on differences such as cloth material, cloth thickness, cloth mesh density, and fiber thickness. In addition, the type of fabric M containing a synthetic resin between fibers is stiffer than the fabric M of a type containing no synthetic resin between fibers. The type of fabric M having high stiffness needs to be given stronger vibration than a fabric M having less stiffness to achieve the same degree of texture improvement.

Thus, the control apparatus 100 controls the degree of texture processing by the vibration applying units 32 and 33 depending on the type of fabric M. Specifically, the control apparatus 100 controls at least one of the amplitude and frequency of the vibration applied to the fabric M by the vibration applying units 32 and 33 according to the type of fabric M. The control apparatus 100 controls at least one of the amplitude and frequency of the vibration applied to the fabric M by the vibration applying units 32 and 33 such that stronger vibration applied to the fabric M is of the type having higher stiffness. The control apparatus 100 may perform any of control only the frequency of the vibration applied to the fabric M by the vibration applying units 32 and 33, control of only the amplitude, and control of both the frequency and the amplitude according to the type of fabric M.

When the type of fabric M is a first type, the control apparatus 100 increases at least one of the amplitude and frequency of the vibration applied to the contact members 51 and 55 more than when the type of fabric M is a second type that is less stiff than the first type. Further, it may be possible to select a range of the amplitude and frequency of the vibration applied to the contact members 51 to the extent that bleeding (blur) caused by damage of the ink layer by the contact members 51 and 55 is not problematic.

Control of Tension Adjustment Units 34 and 35 over Tension

The fibers of the fabric M are bent in a wavy shape according to the weaving method instead of extending straight in the conveyance direction Y. Since fibers of the fabric M and the cloth are bent when the contact members 51 and 55 are brought in contact with the fabric, shear stress applied on the fabric M by the protrusions 52 and 56 of the contact members 51 and 55 decreases. That is, the bending of the fabric M and the fibers at the time of application of vibration causes the degree of processing of the vibration applying units 32 and 33 on the fabric M to be mitigated. Here, a greater amount of tension applied to the fabric M prevents the fabric M or the fibers from bending when the contact members 51 and 55 are brought in contact with the fabric, and thus, the shear stress applied to the fabric M by the contact members 51 and 55 can be curbed. In other words, a greater amount tension to the fabric M causes the shear stress applied to the fabric M by the contact members 51 and 55 to increase and the degree of processing to increase.

For this reason, the control apparatus 100 controls the operation of the tension adjustment units 34 and 35 according to the type of fabric M. Here, the type of fabric M may be a type for determining hardness of the fabric M based on differences such as cloth material, cloth thickness, cloth mesh density, and fiber thickness. The control apparatus 100 adjusts the tension applied to the fabric M by the tension adjustment units 34 and 35 such that stronger tension is applied to the fabric M of the type with higher stiffness.

Control of Heating Temperature of Heating Units 36 and 37

When the type of fabric M is a synthetic fiber, it has the property of softening when the heating temperature increases while there is a difference in the glass transition temperature and the melting point depending on the material of the synthetic fiber. The softening caused by heating of the fabric M increases the degree of texture improvement processing caused by vibration of the contact members 51 and 55. Even when the type of fabric M such as cotton, wool, silk, or the like, is the fabric M containing a synthetic resin between fibers, it has a property of softening when the heating temperature increases, similarly to synthetic fibers. In addition, even when the fabric M is a fabric containing 100% of cotton, wool, or silk, the dried ink contains a synthetic resin as a component, and thus, at least the ink portion has the property of softening when the heating temperature becomes higher. As described above, although fabrics have varied properties depending on the content of synthetic fibers or synthetic resin, the fabric M after printing has the property of softening when the heating temperature becomes higher. Softened synthetic fibers or synthetic resin contained in the fabric M act to increase the degree of processing (degree of texture improvement) applied to the fabric M by the vibration applying units 32 and 33 applying vibration.

Fabric M differs in hardness depending on the difference in cloth material, cloth thickness, cloth mesh density, fiber thickness, and the presence of a synthetic resin among fibers, and the like. The type of fabric M may be a type for determining a hardness of the fabric M. The fabric M of the type having higher stiffness can increase the degree of processing when vibration is applied to the fabric M by increasing the heating temperature, compared to a fabric M with a less hardness.

For this reason, the control apparatus 100 controls the temperature at which the heating units 36 and 37 heat the fabric M according to the type of fabric M. The control apparatus 100 controls the temperature at which the heating units 36 and 37 heat the fabric M such that the fabric M of the type having higher stiffness is heated at a higher temperature.

Control in Accordance with Amount of Ink

The ink portion formed at the dried fabric M contains a synthetic resin as a component, and thus the fabric M tends to be harder as the amount of ink, that is, the average amount of ink per unit area of the fabric M, increases The control apparatus 100 performs at least one of control of vibration applied by the vibration applying units 32 and 33, control of tension by the tension adjustment units 34 and 35, and control of the heating temperature of the heating units 36 and 37 in accordance with an amount of ink. The control apparatus 100 may perform, for example, all of these three kinds of control in accordance with an amount of ink.

The control apparatus 100 controls at least one of the amplitude and frequency of the vibration applied on the fabric M by the vibration applying units 32 and 33 according to an amount of ink. The control apparatus 100 controls at least one of the amplitude and frequency of the vibration applied to the fabric M by the vibration applying units 32 and 33 such that the vibration applied to the fabric M with a larger amount of ink becomes stronger.

The control apparatus 100 controls operations of the tension adjustment units 34 and 35 in accordance with an amount of ink. The control apparatus 100 adjusts the tension applied to the fabric M by the tension adjustment units 34 and 35 to further increase the tension to be applied to the fabric M of the type with a greater amount of ink.

The control apparatus 100 controls the temperature at which the heating units 36 and 37 heat the fabric M according to an amount of ink. The control apparatus 100 controls the temperature at which the heating units 36 and 37 heat the fabric M such that the temperature at which the fabric M with a larger amount of ink is heated becomes higher.

Furthermore, the operator can operate the input unit 131 to select the strength with which the cleaning unit 39 cleans the fabric M. The control apparatus 100 controls the drive unit 93 such that the cleaning unit 39 cleans the fabric M with the strength based on the selection signal input from the input unit 131. The input unit 131 is an example of an operation unit.

Actions of Embodiment

Next, actions of the printing system 10 of this embodiment will be described. In the following, a case that the printing apparatus 11 is of a serial printing method will be described as an example.

Hereinafter, there are a first example in which the buffer unit 31 is not utilized and a second example in which the buffer unit 31 is utilized. First, the first example in which the buffer unit 31 is not utilized will be described.

First Example

Operations of the printing apparatus 11 include the first operation associated with conveyance of the fabric M and the second operation associated with a stop of the fabric M. When the buffer unit 31 is utilized, even if the printing apparatus 11 stops the conveyance of the fabric M, the processing apparatus 30 can continue processing for the amount of the slack of the fabric M formed in the buffer unit 31. The buffer unit 31 is not utilized in the first example. For this reason, the control apparatus 100 controls the operation of the processing apparatus 30 such that the operation is stopped or reduced in accordance with the operation of the printing apparatus 11 when the printing apparatus 11 shifts from the first operation to the second operation.

(a) Stop of Fabric M Due to Intermittent Conveyance by Printing Apparatus 11

When the printing apparatus 11 is of the serial printing method, the fabric M is intermittently conveyed. The printing apparatus 11 alternately performs a printing operation in which printing is performed for one row (one pass of printing) by ejecting ink from the print head 18 while the fabric M is stopped and the carriage 17 is moved in the width direction X and a conveyance operation in which the fabric M is conveyed to the next printing position. When the conveyance operation (first operation) ends, it switches to the printing operation (second operation), and the conveyance of the fabric M is stopped during this printing operation. That is, the printing apparatus 11 intermittently conveys the fabric M during printing. When the printing apparatus 11 stops at the intervals of the intermittent conveyance of the fabric M, the control apparatus 100 stops conveyance of the fabric M to the processing apparatus 30 and stops the operations of the vibration applying units 32 and 33. Then, the control apparatus 100 causes the conveyance of the fabric M by the printing apparatus 11 to restart, the conveyance of the fabric M to the processing apparatus 30 to restart, and the operations of the vibration applying units 32 and 33 to restart. Thus, even when the fabric M is intermittently conveyed by the printing apparatus 11, the processing apparatus 30 can perform texture improvement processing at an appropriate degree of processing on the printed fabric M.

(b) Deceleration Operation Caused by Increase in Number of Passes of Printing Apparatus 11

Parameters of printing conditions include print resolution (or number of passes). The conveyance distance of the fabric M conveyed every one pass becomes shorter as the printing resolution becomes higher. For this reason, as the number of passes becomes higher, the average conveyance speed of the fabric M conveyed in the intermittent conveyance becomes lower. That is, by changing from the first number of passes to the second number of passes that is a higher number than the former, the average conveyance speed of the fabric M at the printing apparatus 11 is switched from the first conveyance speed V1 to the second conveyance speed V2 that is lower than the former. The control apparatus 100 switches the conveyance speed at which the processing apparatus 30 conveys the fabric M from the first conveyance speed V1 to the second conveyance speed V2, and performs control such that at least one of the amplitude and frequency of the vibration applied to the fabric M by the vibration applying units 32 and 33 is reduced.

(c) Conveyance Stop Due to Maintenance

The printing apparatus 11 performs cleaning by driving the maintenance unit 19 when a predetermined cleaning time comes during printing. The cleaning is an operation in which the print head 18 is moved to the home position, the cap of the maintenance unit 19 is brought in contact with or close to the print head 18 to forcibly discharge the ink from the nozzles of the print head 18 for cleaning. In this state, the nozzles are cleaned by forcibly discharging ink from the nozzles of the print head 18. Through cleaning, foreign substances such as thickened ink in the nozzles or bubbles in the ink are forcibly discharged. When cleaning is performed, neither printing operation nor conveyance of the fabric M is stopped. In other words, the first operation in which printing is performed transitions to the second operation in which cleaning is performed. When the printing apparatus 11 performing printing transitions to the cleaning operation (second operation) from the printing operation (first operation) when the cleaning time comes, the control apparatus 100 causes the processing apparatus 30 to stop the conveyance of the fabric M and the vibration applying units 32 and 33 to stop applying vibration to the fabric M.

(d) Conveyance Stop Operation at Time of Replacing Print Data

When printing content such as design performed by the printing apparatus 11 on the fabric M is to be changed, the operator operates the input unit 131 to change the print data PD. During the operation of changing the print data PD, the printing operation of the printing apparatus 11 is temporarily stopped. The carriage 17 moves to the home position, and the print head 18 is capped with the cap of the maintenance unit 19. When the print data PD is to be changed, the printing operation and the conveyance of the fabric M stop. When the operator operates the input unit 131 to select a change of the print data PD, the control apparatus 100 stops the printing operation of the printing apparatus 11. The control apparatus 100 stops the printing operation based on the current print data PD by the operator. The control apparatus 100 stops the operation of the processing apparatus 30 in accordance with the stop of the printing apparatus 11. In other words, upon receiving the replacement of the print data during printing by the printing apparatus 11, the control apparatus 100 causes the printing apparatus 11 to transition from the printing operation (first operation) to the print data replacement operation (second operation). The control apparatus 100 causes the processing apparatus 30 to stop the conveyance of the fabric M and the vibration applying units 32 and 33 to stop applying vibration to the fabric M according to the transition of the operations of the printing apparatus 11.

The control apparatus 100 performs at least one of control of vibration applied by the vibration applying units 32 and 33, control of tension by the tension adjustment units 34 and 35, and control of the heating temperature of the heating units 36 and 37 in accordance with the type of fabric M.

(e) Vibration Applying Operation (e-1) Control According to Type of Fabric M

The control apparatus 100 controls at least one of the amplitude and frequency of the vibration applied to the fabric M by the vibration applying units 32 and 33 according to the type of fabric M. The control apparatus 100 controls at least one of the amplitude and frequency of the vibration applied to the fabric M by the vibration applying units 32 and 33 such that stronger vibration is applied to the fabric M of the type having higher stiffness. When the type of fabric M is a first type, the control apparatus 100 increases at least one of the amplitude and frequency of the vibration applied to the contact members 51 and 55 more than when the type of fabric M is a second type that is less stiff than the first type. Further, the fabric M tends to become harder as the thickness increases. Thus, the control apparatus 100 may control at least one of the amplitude and frequency of vibration applied to the contact members 51 and 55 according to the thickness of the fabric M, similarly to the type of fabric M.

(e-2) Control According to Amount of Ink

The control apparatus 100 controls at least one of the amplitude and frequency of the vibration applied to the fabric M by the vibration applying units 32 and 33 according to the amount of ink ejected onto the fabric M. The control apparatus 100 controls at least one of the amplitude and frequency of the vibration applied to the fabric M by the vibration applying units 32 and 33 such that the vibration applied to the fabric M with a larger amount of ink becomes stronger. The control apparatus 100 increases at least one of the amplitude and frequency of the vibration applied to the contact members 51 and 55 more when the amount of ink is a first ink amount than when the amount of ink is a second ink amount that is smaller than the first ink amount.

(f) Tension Applying Operation (f-1) Control According to Type of Fabric M

The control apparatus 100 controls operations of the tension adjustment units 34 and 35 according to the type of fabric M. The control apparatus 100 adjusts the tension applied to the fabric M by the tension adjustment units 34 and 35 such that stronger tension is applied to the fabric M of the type with higher stiffness. The control apparatus 100 increases the tension applied to the fabric M by the tension adjustment units 34 and 35 more when the type of fabric M is the first type than when the type of fabric M is the second type that is less stiff than the first type. Further, the fabric M tends to become harder as the thickness increases. Thus, the control apparatus 100 may control the operations of the tension adjustment units 34 and 35 according to the thickness of the fabric M, similar to the type of fabric M.

(f-2) Control According to Amount of Ink

The control apparatus 100 controls the operations of the tension adjustment units 34 and 35 in accordance with the amount of ink ejected onto the fabric M. The control apparatus 100 adjusts the tension applied to the fabric M by the tension adjustment units 34 and 35 to further increase the tension to be applied to the fabric M of the type with a greater amount of ink. The control apparatus 100 increases the tension applied to the fabric M by the tension adjustment units 34 and 35 more when the amount of ink is the first ink amount than when the amount of ink is the second ink amount that is smaller than the first ink amount.

(g) Heating Operation (g-1) Control According to Type of Fabric M

The control apparatus 100 controls the temperature at which the heating units 36 and 37 heat the fabric M according to the type of fabric M. The control apparatus 100 controls the temperature at which the heating units 36 and 37 heat the fabric M such that the fabric M of the type having higher stiffness is heated at a higher temperature. The control apparatus 100 increases the temperature at which the heating units 36 and 37 heat the fabric M more when the type of fabric M is the first type than when the type of fabric M is the second type that is less stiff than the first type. Further, the fabric M tends to become harder as the thickness increases. For this reason, the control apparatus 100 may control the temperature at which the heating units 36 and 37 heat the fabric M according to the thickness of the fabric M, similar to the type of fabric M.

(g-2) Control According to Amount of Ink

The control apparatus 100 controls the temperature at which the heating units 36 and 37 heat the fabric M according to an amount of ink ejected onto the fabric M. The control apparatus 100 controls the temperature at which the heating units 36 and 37 heat the fabric M such that the fabric M with a larger amount of ink is heated at a higher temperature. The control apparatus 100 increases the temperature at which the heating units 36 and 37 heat the fabric M more when the amount of ink is the first ink amount than when the amount of ink is the second ink amount that is smaller than the first ink amount.

(h) Control over Cleaning Operation According to Operation of Processing Apparatus 30

The control apparatus 100 controls the operation of the drive unit 93 of the cleaning unit 39 according to an operation of the processing apparatus 30. For example, the control apparatus 100 controls the strength with which the cleaning unit 39 cleans the fabric M according to an operation of the processing apparatus 30. The control apparatus 100 controls the strength with which the cleaning unit 39 cleans the fabric M such that the cleaning strength increases as the strength of the processing performed on the fabric M by the vibration applying units 32 and 33 becomes greater. This is because there is a tendency that more fiber powder is generated as the strength of the processing performed on the fabric M by the vibration applying units 32 and 33 becomes greater. The control apparatus 100 increases the strength with which the cleaning unit 39 cleans the fabric M more when the strength of the processing performed on the fabric M is a first strength than when it is a second strength that is smaller than the first strength. For example, by increasing the driving speed of the drive unit 93, the strength with which the cleaning unit 39 cleans the fabric M, for example, the rotational speed of the rotary brushes, is increased.

(i) Control over Fiber Powder Removal Operation According to Operation of Processing Apparatus 30

The control apparatus 100 controls the operation of the collecting unit 94 removing the fiber powder from the portion of the fabric M after the fabric M is cleaned according to an operation of the processing apparatus 30. For example, the control apparatus 100 controls the strength with which the collecting unit 94 removes the fiber powder from the portion of the fabric M after the fabric M is cleaned according to an operation of the processing apparatus 30. The control apparatus 100 controls the strength with which the collecting unit 94 removes the fiber powder such that the fiber powder is removed with greater strength when the cleaning strength is higher. This is because there is a tendency that, when the cleaning strength is higher, more fiber powder is generated since the fabric M has been subjected to stronger processing by the vibration applying units 32 and 33. The control apparatus 100 increases the strength with which the collecting unit 94 removes fiber powder more when the cleaning strength is a first strength than when it is a second strength that is smaller than the first strength. For example, by increasing the rotational speed of the fan 97, the collecting unit 94 has a greater strength for removing (sucking) the fiber powder.

Second Example

Next, a second example in which the buffer unit 31 is utilized will be described. Even when the printing apparatus 11 transitions from the first operation to the second operation, the processing is continued under the same conditions as when the printing apparatus 11 performs the first operation by utilizing the buffer unit 31, without stopping or changing the processing of the processing apparatus 30.

When the conveyance operation of the fabric M is temporarily stopped or decelerated in the printing apparatus 11, the processing apparatus 30 continues the operation of processing on the fabric M under the same conditions as when the printing apparatus 11 performs the first operation in the tolerance period in which a slack of the fabric M formed in the buffer unit 31 disappears.

The tolerance period of the buffer unit 31 is acquired from a calculation result obtained by calculating the difference between the amount of slack of the fabric M formed in the buffer unit 31 and the detection result of a sensor (not illustrated) or the amount of the fabric M fed between the printing apparatus 11 and the processing apparatus 30. Since the tolerance period is longer than the intermittent stop period associated with intermittent conveyance described in (a) above, even when the printing apparatus 11 transitions from the first operation to the second operation using an intermittent stop, the processing apparatus 30 continues the operation of processing the fabric M under the same conditions as when the printing apparatus 11 performs the first operation. By gradually reducing the slack of the fabric M in the buffer unit 31 in this intermittent stop period, the supply of the fabric M to the processing apparatus 30 is continued.

In addition, if this tolerance period is set to be longer than the cleaning period s, the processing apparatus 30 continues the operation of processing the fabric M under the same conditions as when the printing apparatus 11 performs the first operation. Specifically, even when the operation transitions to the cleaning operation (second operation) in which the printing operation is stopped for cleaning and the conveyance of the fabric M is temporarily stopped, the processing apparatus 30 continues the operation of processing the fabric M under the same conditions as when the printing apparatus 11 performs the first operation. By gradually reducing the slack of the fabric M in the buffer unit 31 in this cleaning period, the supply of the fabric M to the processing apparatus 30 is continued.

Further, even in the print data replacement time described in (d) above, the processing apparatus 30 may continue the operation of processing the fabric M under the same conditions as when the printing apparatus 11 performs the first operation in the tolerance period. In addition, when the cleaning period described in (c) above is longer than the tolerance period, the processing apparatus 30 may continue the operation of processing the fabric M under the same conditions as when the printing apparatus 11 performs the first operation in the tolerance period. Since the print data replacement time described in (d) above is determined based on the operator's operation time and the time is variable, the operation of the processing apparatus 30 may be stopped and the processing speed may be reduced at the time when the printing apparatus 11 switches from the first operation to the second operation. When the processing speed is reduced, a longer required time exceeding the tolerance period can be ensured, and the frequency of stopping the processing can be reduced. By reducing the processing speed, it is possible to prevent the texture improvement degree of the portion of the fabric M from being significantly different from other portions due to the longer time to stop the processing.

The control apparatus 100 performs control similar to that of the first example in which the buffer unit 31 is not utilized, except for the above-described control in which the buffer unit 31 is utilized. That is, the control apparatus 100 similarly performs the control of (e) to (i) described above in the first example.

In the above-described first and second examples, regardless of the operation of the printing apparatus 11, the processing by the vibration applying units 32 and 33 is uniformly performed on the fabric M on which printing has been completed and fed from the printing apparatus 11. Thus, it is possible to manufacture a fabric M2 with appropriate texture with a uniform texture improvement degree as a roll body R2.

Effects of Embodiment

According to an embodiment, the following effects can be obtained.

(1) The printing system 10 includes the printing apparatus 11 that performs printing on a fabric M, a processing apparatus 30, and a control apparatus 100. The processing apparatus 30 includes the contact members 51 and 55 having a plurality of protrusions 52 and 56 that come in contact with the fabric M on which printing has been performed by the printing apparatus 11, and the vibration applying units 32 and 33 including the vibration generating sources 53 and 57 that apply vibration to the contact members 51 and 55. The control apparatus 100 controls operations of the processing apparatus 30 in accordance with operations of the printing apparatus 11. According to this configuration, the fabric M is loosened due to physical processing performed thereon such as repetitive poking or hitting the fabric M with the plurality of protrusions 52 and 56 by the contact members 51 and 55 with vibration applied, and thus the texture of the fabric M can be improved due to this loosening. The operation of the processing apparatus 30 can be changed in accordance with the operation of the printing apparatus 11. Accordingly, regardless of the operation of the printing apparatus 11, the processing apparatus 30 can perform uniform processing on the fabric M. As a result, the texture of the fabric M can be improved, compared to a configuration in which the operation of the processing apparatus 30 is not controlled according to the operation of the printing apparatus 11.

(2) The fabric M is intermittently conveyed in the processing apparatus 30. The control apparatus 100 reduces at least one of the amplitude and frequency of the vibration during a stop period in which the conveyance of the fabric M is stopped in intermittent conveyance. Here, "reduce" includes stopping the operation of the processing apparatus 30. According to this configuration, it is possible to prevent the same spot of the fabric M, which is stopped at the intervals of the intermittent conveyance, from being excessively processed.

(3) The control apparatus 100 controls at least one of the amplitude and frequency of vibration according to the type of fabric M. According to this configuration, at least one of the amplitude and frequency of the vibration applied to the contact members 51 and 55 can be controlled according to the type of fabric M. That is, at least one of the amplitude and frequency of the loosening operation in which the plurality of protrusions 52 and 56 are repeatedly brought in contact with the fabric M at the amplitude and frequency of the vibration applied by the contact members 51 and 55. For example, when the fabric M is a type having high stiffness, it is possible to process the fabric M with strength suitable for the stiffness of the fabric M by increasing at least one of the amplitude and frequency. Thus, the fabric M can be given proper texture, regardless of the difference in stiffness according to the type of fabric M.

(4) The processing apparatus 30 includes the tension adjustment units 34 and 35 capable of adjusting tension acting on the fabric M processed by the processing apparatus 30. The control apparatus 100 controls operations of the tension adjustment units 34 and 35 according to the type of fabric M. According to this configuration, the tension acting on the fabric M processed by the processing apparatus 30 is adjusted according to the type of fabric M. For example, tension is increased for the fabric M of the type having higher stiffness. As a result, even if vibration conditions are the same, it is possible to enhance the effect of the loosening operation received by the fabric M when the contact members 51 and 55 apply physical processing such as repetitive poking or hitting to the fabric M with the plurality of protrusions 52 and 56. Thus, even when vibration of the contact members 51 and 55 is the same, the fabric M can be given proper texture, regardless of a difference in stiffness according to the type of fabric M.

(5) The printing apparatus 11 applies a liquid onto the fabric M to perform printing on the fabric M. The control apparatus 100 controls at least one of the amplitude and frequency of vibration according to the amount of liquid applied onto the fabric M. According to this configuration, at least one of the amplitude and frequency of vibration is controlled according to the amount of liquid applied onto the fabric M during printing. For example, when the stiffness of the fabric M is increased due to the print layer created after the liquid is dried when the amount of liquid applied to the fabric M is large, a stronger loosening operation can be applied to the fabric M by increasing at least one of the amplitude and frequency. Thus, the fabric M can be given proper texture, regardless of the difference in stiffness of the fabric M attributable to the difference in thickness of the print layer according to the amount of liquid applied to the fabric M.

(6) The processing apparatus 30 includes the heating units 36 and 37 that heat the portion of the fabric M that has been processed with printing by the printing apparatus 11 and drying by the drying apparatus to dry the fabric M, and that will be processed by the vibration applying units 32 and 33. According to this configuration, the portion of the fabric M to be processed with vibration by the processing apparatus 30, the fabric M having been processed with drying after printing, can be heated. Thus, it is possible to realize improvement in the fixing properties of the printed image and improvement in the loosening effect by the vibration applying units 32 and 33 to utilize softening of the heated portion of the fabric M.

(7) The control apparatus 100 controls the temperature at which the heating units 36 and 37 heat the fabric M according to the type of fabric M. The fabric M has softness changing due to temperature. The method of changing the softness using temperature varies depending on the type of fabric M. According to this configuration, the temperature at which the heating units 36 and 37 heat the fabric M is controlled according to the type of fabric M, and thus it is possible to more optimize the loosening effect according to the type of fabric M.

(8) The cleaning unit 39 for cleaning a portion of the fabric M after the fabric M is processed by the processing apparatus 30 is provided. According to this configuration, fiber powder such as fluff generated from the fabric M in processing by the processing apparatus 30 is removed from the fabric M, and thus a clean fabric M can be collected.

(9) The cleaning unit 39 includes the removal members 91 and 92 that clean the fabric M while in contact with the fabric M, and the drive unit 93 that drives the removal members 91 and 92. The control apparatus 100 controls the operation of the drive unit 93 according to an operation of the processing apparatus 30. A difference in operations of the processing apparatus 30 leads to a difference in strength of the processing applied to the fabric M. For this reason, the amount of fiber powder such as the fluff generated from the fabric M changes according to the operation of the processing apparatus 30. According to this configuration, the control apparatus 100 controls the operation of the drive unit 93 according to the operation of the processing apparatus 30, and thus it is possible to clean the fabric M with proper strength according to the amount of fiber powder generated in cleaning. For example, it is possible to prevent the fabric M from being damaged due to excessive cleaning of fabric M.

(10) The printing system 10 includes the input unit 131 that is operated to enable information to be input.

The input unit 131 enables to select the strength with which the cleaning unit 39 cleans the fabric M and to input the strength. The control apparatus 100 controls the drive unit 93 such that the cleaning unit 39 cleans the fabric M with the strength based on the selection signal input to the input unit 131. According to this configuration, the operator operates the input unit 131 to select the strength with which the removal members 91 and 92 of the cleaning unit 39 clean the fabric M. Since the operator can appropriately select the desired strength, for example, damage to the fabric M caused by excessive cleaning of the fabric M can be avoided more easily.

(11) The processing apparatus 30 performs processing on the fabric M on which printing has been completed supplied from the printing apparatus 11 that performs printing on the fabric M. The processing apparatus 30 includes the contact members 51 and 55, the vibration applying units 32 and 33, and the control apparatus 100. The contact members 51 and 55 have a plurality of protrusions 52 and 56 that come in contact with the fabric M supplied from the printing apparatus 11. The vibration applying units 32 and 33 include the vibration generating sources 53 and 57 that apply vibration to the contact members 51 and 55. The control apparatus 100 controls the operation of processing the fabric M by the contact members 51 and 55 to which vibration is applied by the vibration generating sources 53 and 57. The control apparatus 100 controls the operation of processing the fabric M according to the operation of the printing apparatus 11. According to this configuration, regardless of the operation of the printing apparatus 11, the processing apparatus 30 can perform uniform processing on the fabric M. As a result, the texture of the fabric M can be improved, compared to a configuration in which the operation of the processing apparatus 30 is not controlled according to the operation of the printing apparatus 11.

Further, the above-described embodiment may be modified in the mode such as the following modified examples. Furthermore, an example obtained by appropriately combining the above-described embodiment and any of the modified examples described below can be a further modified example, and an example obtained by appropriately combining the modified examples described below can be a further modified example.

The type of fabric M is not limited to being input to the control apparatus 100 by an operator operating the input unit 131 such as a touch panel or an operation button, and may be acquired by capturing an image of the fabric M with a camera that can capture the image, analyzing the image by the control apparatus 100, and specifying the type of fabric M.

The control apparatus 100 may control the operation of the processing apparatus 30 based on information about the type of fabric M selected on the screen of the display unit 132 by the operator operating the input unit 131.

The control apparatus 100 may control vibration applied by the vibration applying units 32 and 33 based on the information of the strength of the vibration (processing strength) selected by the operator on the screen of the display unit 132 by operating the input unit 131.

Although the embodiment described above has the configuration in which all three factors that are temperature, tension, and vibration to be given to the portion to be processed for texture improvement can be controlled according to the type of fabric, a configuration in which at least one of the three factors is controlled may be adopted. For example, a configuration in which only temperature is controlled according to the type of fabric, a configuration in which only tension is controlled according to the type of fabric, or a configuration in which only vibration is controlled according to the type of fabric may be adopted. Furthermore, a configuration in which only two factors that are temperature and tension are controlled according to the type of fabric, a configuration in which two factors that are tension and vibration are controlled according to the type of fabric, or a configuration in which two factors that are temperature and vibration are controlled according to the type of fabric may be adopted.

The control apparatus 100 may be configured to reduce at least one of the amplitude and frequency of vibration while the conveyance of the fabric M is stopped. In this case, the control apparatus 100 may be configured to stop at least one of the amplitude and frequency of vibration while the conveyance of the fabric M is stopped. In other words, reducing at least one of the amplitude and frequency of vibration is not limited to reducing the value of at least one of the amplitude and frequency of vibration to a value greater than zero, and may also include a stop with the value of zero.

Although vibration is applied in a dry mode without using a liquid for the fabric M in the embodiment described above, the fabric M may be hit by the protrusions 52 and 56 of the contact members 51 and 55 by applying vibration to the contact members 51 and 55 with a liquid applied to the fabric M. In this case, the liquid may be, for example, water or a softener.

Although the removal members 91 and 92 constituting the cleaning unit 39 are rotary brushes in the embodiment described above, they may be a straight-type brush. The straight-type brush has a length in the width direction X in which the brush can come in contact with the entire region of the fabric M with a maximum width that can be printed by the printing apparatus 11, and for example, foreign substances such as fiber powder are removed from both surfaces (processing surfaces) of the fabric M as a pair of straight-type brushes are in contact with both surfaces of the fabric M. In this case, the straight-type brushes may be configured to adjust the pressing force when they come in contact with the processing surface of the fabric M. In this case, the control apparatus 100 performs control such that the pressing force when the straight-type brushes come in contact with the processing surface of the fabric M increases when stronger processing in which more fiber powder is generated is performed.

The printing apparatus 11 is not limited to a textile printing apparatus for performing printing the fabric M such as a fabric, and may be an ink-jet printer that performs printing the fabric M such as paper.

The printing apparatus 11 is not limited to a serial printer in which the print head 18 moves back and forth in the width direction X of the fabric M, or a line printer in which the print head 18 does not move in the width direction X, and may be a lateral printer in which the print head 18 can move in the two direction of the width direction X and the conveyance direction Y.

The printing apparatus 11 is not limited to a digital textile printing apparatus, and may be an analog textile printing apparatus. In this case, the analog textile printing apparatus may perform silk screen printing, or may use a textile printing method using dyeing in which the fabric M is immersed in ink. In addition, the printing apparatus 11 may have a configuration in which the print head 18 is a dispenser that ejects a liquid, or may have a configuration in which a liquid such as ink is dropped to the fabric M.

The printing apparatus 11 is not limited to employing an ink-jet method, and may employ a dot-impact method, a laser method, or a thermal transfer method.

Hereinafter, technical concepts and effects thereof that are understood from the above-described embodiment and modified examples will be described.

(A) A printing system includes a printing apparatus that performs printing on a fabric, a processing apparatus including a contact member including a plurality of protrusions that come in contact with the fabric on which printing has been performed by the printing apparatus and a vibration applying unit including a vibration generating source that applies vibration to the contact member, and a control apparatus that controls an operation of the processing apparatus according to an operation of the printing apparatus.

According to this configuration, the fabric is loosened due to physical processing performed thereon such as repetitive poking or hitting the fabric with the plurality of protrusions by the contact member with vibration applied, and thus the texture of the fabric can be improved due to this loosening. The operation of the processing apparatus can be changed in accordance with an operation of the printing apparatus. Accordingly, regardless of the operation of the printing apparatus, the processing apparatus can perform uniform processing on the fabric. As a result, the texture of the fabric can be improved, compared to a configuration in which the operation of the processing apparatus is not controlled according to the operation of the printing apparatus.

(B) In the printing system, the fabric may be intermittently conveyed in the processing apparatus, and the control apparatus may reduce at least one of an amplitude or a frequency of the vibration during a stop period in which the conveyance of the fabric is stopped in the intermittent conveyance. Here, "reduce" includes stopping the operation of the processing apparatus.

According to this configuration, it is possible to prevent the same spot of the fabric, which is stopped at the intervals of the intermittent conveyance, from being excessively processed.

(C) In the printing system, the control apparatus may control at least one of an amplitude or a frequency of the vibration according to the type of fabric.

According to this configuration, at least one of the amplitude and frequency of the vibration applied to the contact member can be controlled according to the type of fabric. That is, at least one of the amplitude and frequency of the loosening operation in which the plurality of protrusions are repeatedly brought in contact with the fabric at the amplitude and frequency of the vibration applied by the contact member is controlled. For example, when the fabric is of a type having high stiffness, it is possible to process the fabric with strength suitable for the stiffness of the fabric by increasing at least one of the amplitude and frequency. Thus, the fabric can be given proper texture, regardless of the difference in stiffness according to the type of fabric.

(D) The printing system includes a tension adjustment unit capable of adjusting tension acting on the fabric processed by the processing apparatus, and the control apparatus may control an operation of the tension adjustment unit according to the type of fabric.

According to this configuration, the tension acting on the fabric processed by the processing apparatus is adjusted according to the type of fabric. For example, tension is increased for the fabric of the type having higher stiffness. As a result, even if vibration conditions are the same, it is possible to enhance the effect of the loosening operation received by the fabric when the contact member applies physical processing such as repetitive poking or hitting to the fabric with the plurality of protrusions. Thus, even when vibration of the contact member is the same, the fabric can be given proper texture, regardless of a difference in stiffness according to the type of fabric.

(E) In the printing system, the printing apparatus may apply a liquid to the fabric to perform printing on the fabric, and the control apparatus may control at least one of the amplitude and frequency of the vibration according to the amount of the liquid applied to the fabric.

According to this configuration, at least one of the amplitude and frequency of the vibration is controlled according to the amount of liquid applied onto the fabric during printing. For example, when the stiffness of the fabric is increased due to the print layer created after the liquid is dried when the amount of liquid applied to the fabric is large, a stronger loosening operation can be applied to the fabric by increasing at least one of the amplitude and frequency. Thus, the fabric can be given proper texture, regardless of the difference in stiffness of the fabric attributable to the difference in thickness of the print layer according to the amount of liquid applied to the fabric.

(F) The printing system may include a heating unit that heats a portion of the fabric that has been processed with printing by the printing apparatus and drying by a drying apparatus to dry the fabric, and that will be processed by the vibration applying unit.

According to this configuration, the portion of the fabric that has been processed with drying after printing and that will be processed with vibration in the processing apparatus is heated. Thus, it is possible to realize improvement in the fixing properties of the printed image and improvement in the loosening effect by the vibration applying unit to utilize softening of the heated portion of the fabric.

(G) In the printing system, the control apparatus may control a temperature at which the heating unit heats the fabric according to the type of fabric.

The fabric has softness changing due to temperature. The method of changing the softness using temperature varies depending on the type of fabric. According to this configuration, the temperature at which the heating unit heats the fabric is controlled according to the type of fabric, and thus it is possible to more optimize the loosening effect according to the type of fabric.

(H) The printing system may include a cleaning unit that cleans a portion of the fabric after the fabric is processed by the processing apparatus.

According to this configuration, fiber powder such as fluff generated from the fabric in processing by the processing apparatus is removed from the fabric, and thus a clean fabric can be collected.

(I) In the printing system, the cleaning unit may include a removal member that cleans the fabric while in contact with the fabric, and a drive unit that drives the removal member, and the control apparatus may control an operation of the drive unit according to an operation of the processing apparatus.

A difference in operations of the processing apparatus leads to a difference in strength of the processing applied to the fabric. For this reason, the amount of fiber powder such as fluff generated from the fabric changes according to the operation of the processing apparatus. According to this configuration, the control apparatus controls the operation of the drive unit according to the operation of the processing apparatus, and thus it is possible to clean the fabric with proper strength according to the amount of fiber powder generated in cleaning. For example, it is possible to prevent the fabric from being damaged due to excessive cleaning of the fabric.

(J) The printing system includes an input unit that is operated to enable information to be input, and the input unit may be configured to select a strength with which the cleaning unit cleans the fabric and enable the strength to be input, and the control apparatus may control the drive unit such that the cleaning unit cleans the fabric with the strength based on a selection signal input to the input unit.

According to this configuration, the operator operates the input unit to select a strength with which the removal member cleans the fabric. Since the operator can appropriately select a desired strength, for example, damage to the fabric caused by excessive cleaning of the fabric can be avoided more easily.

(K) The processing apparatus is a processing apparatus that processes a fabric supplied from a printing apparatus that performs printing on the fabric on which printing has been performed, and includes a contact member having a plurality of protrusions that come in contact with the fabric supplied from the printing apparatus, a vibration applying unit including a vibration generating source that applies vibration to the contact member, and a control apparatus that controls a fabric processing operation of the contact member to which vibration is applied by the vibration generating source, and the control apparatus controls the fabric processing operation according to an operation of the printing apparatus.

According to this configuration, regardless of the operation of the printing apparatus, the processing apparatus can perform uniform processing on the fabric. As a result, the texture of the fabric can be improved, compared to a configuration in which the operation of the processing apparatus is not controlled according to the operation of the printing apparatus.

What is claimed is:

1. A printing system comprising:

a printing apparatus configured to perform printing on a fabric;

a processing apparatus including a contact member including a plurality of protrusions that come in contact with the fabric on which printing was performed by the printing apparatus, and a vibration applying unit including a vibration generating source configured to apply vibration to the contact member; and a control apparatus configured to control an operation of the processing apparatus according to an operation of the printing apparatus, wherein the control apparatus controls at least one of an amplitude or a frequency of the vibration according to a type of the fabric.

2. A printing system comprising:

a printing apparatus configured to perform printing on a fabric;

a processing apparatus including a contact member including a plurality of protrusions that come in contact with the fabric on which printing was performed by the printing apparatus, and a vibration applying unit including a vibration generating source configured to apply vibration to the contact member; and a control apparatus configured to control an operation of the processing apparatus according to an operation of the printing apparatus, wherein the fabric is intermittently conveyed in the processing apparatus, and the control apparatus reduces at least one of an amplitude or a frequency of the vibration during a stop period in which conveyance of the fabric is stopped in the intermittent conveyance.

3. The printing system according to claim 1, comprising a tension adjustment unit configured to adjust a tension acting on the fabric processed by the processing apparatus, wherein the control apparatus controls an operation of the tension adjustment unit according to the type of the fabric.

4. The printing system according to claim 1, wherein the printing apparatus applies a liquid to the fabric to perform printing on the fabric, and the control apparatus controls at least one of the amplitude or the frequency of the vibration according to an amount of the liquid applied to the fabric.

5. The printing system according to claim 1, comprising a heating unit configured to heat a portion, of the fabric, after being subjected to a printing process by the printing apparatus and a drying process by a drying apparatus to dry the fabric and before being processed by the vibration applying unit.

6. The printing system according to claim 5, wherein the control apparatus controls, according to the type of the fabric, a temperature at which the heating unit heats the fabric.

7. The printing system according to claim 1, comprising a cleaning unit configured to clean a portion, of the fabric, after being processed by the processing apparatus.

8. The printing system according to claim 7, wherein the cleaning unit includes a removal member configured to clean the fabric while being in contact with the fabric, and a drive unit configured to drive the removal member, wherein the control apparatus controls an operation of the drive unit according to an operation of the processing apparatus.

9. The printing system according to claim 8, comprising an input unit configured to receive an operation for information input, wherein the input unit is configured to select an intensity at which the cleaning unit cleans the fabric and receive an input of the intensity, and the control apparatus controls the drive unit such that the cleaning unit cleans the fabric at the intensity based on a selection signal input to the input unit.

10. A processing apparatus configured to process a fabric on which printing was performed, the fabric being supplied from a printing apparatus configured to perform printing on the fabric, the processing apparatus comprising:

a contact member including a plurality of protrusions that come in contact with the fabric supplied from the printing apparatus;

a vibration applying unit including a vibration generating source configured to apply vibration to the contact member; and a control apparatus configured to control an operation of processing the fabric by the contact member to which vibration is applied by the vibration generating source, wherein the control apparatus controls the operation of processing the fabric according to an operation of the printing apparatus, and the control apparatus controls at least one of an amplitude or a frequency of the vibration according to a type of the fabric.

* * * * *